US012184954B1

(12) United States Patent
Cho et al.

(10) Patent No.: US 12,184,954 B1
(45) Date of Patent: Dec. 31, 2024

(54) COMPUTER-IMPLEMENTED METHODS FOR DETERMINING PUBLISHING PARAMETERS FOR A CONTENT DELIVERY SYSTEM

(71) Applicant: Amazon Technologies, Inc., Seattle, WA (US)

(72) Inventors: Jae In Cho, Hoboken, NJ (US); John Martin Miller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 18/184,507

(22) Filed: Mar. 15, 2023

(51) Int. Cl.
*H04N 21/854* (2011.01)
*H04N 21/25* (2011.01)

(52) U.S. Cl.
CPC ......... *H04N 21/854* (2013.01); *H04N 21/251* (2013.01)

(58) Field of Classification Search
CPC .................. H04N 21/854; H04N 21/251
See application file for complete search history.

(56) References Cited

U.S. PATENT DOCUMENTS

| 2018/0243656 | A1* | 8/2018 | Aghdaie | ............... | A63F 13/67 |
| 2020/0384367 | A1* | 12/2020 | Lake-Schaal | .......... | A63F 13/70 |
| 2021/0264321 | A1* | 8/2021 | Xiang | .................... | G06N 20/20 |

* cited by examiner

*Primary Examiner* — Oschta I Montoya
(74) *Attorney, Agent, or Firm* — NICHOLSON DE VOS WEBSTER & ELLIOTT LLP

(57) ABSTRACT

Techniques for utilizing machine learning to generate and use publishing parameters for a content delivery system are described. According to some examples, a computer-implemented method includes receiving, by a content delivery service, a request from a content provider device to send a media file to a client device; determining, by a provider intention match machine learning model of the content delivery service, a first set of one or more potential publishing parameters for the media file based on the request; sending a proposal to the content provider device to send the media file to the client device according to the first set of one or more potential publishing parameters; receiving, by the content delivery service, an indication from the content provider device to modify the first set of one or more potential publishing parameters for the media file; determining, by a negotiation simulation machine learning model of the content delivery service, a second set of one or more potential publishing parameters for the media file based on the indication from the content provider device; and sending the media file to the client device based on the second set of one or more potential publishing parameters.

20 Claims, 18 Drawing Sheets

COMPUTER-IMPLEMENTED METHODS FOR DETERMINING PUBLISHING PARAMETERS FOR A CONTENT DELIVERY SYSTEM

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

DETAILED DESCRIPTION

Figure 1:
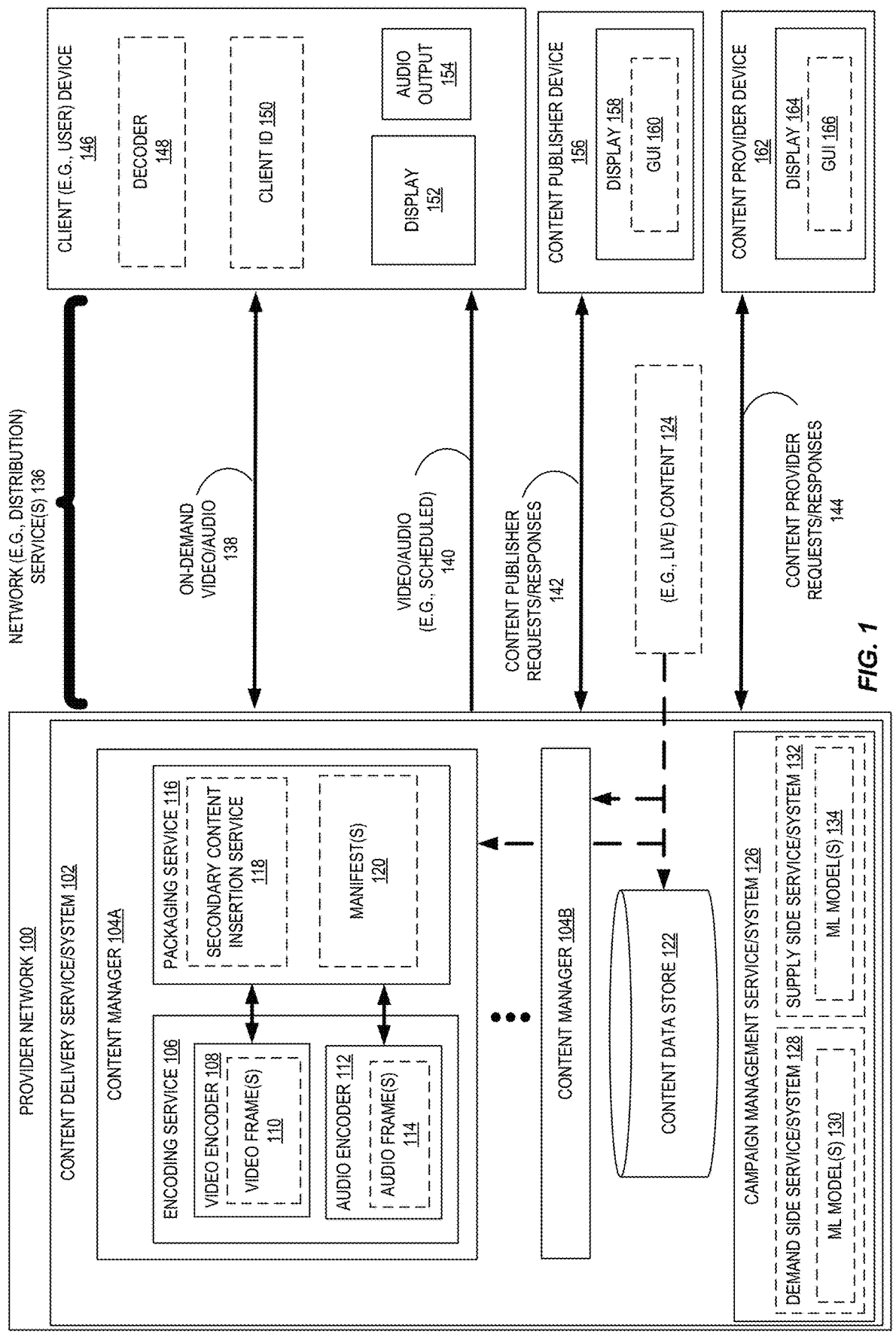
FIG. 1 is a diagram illustrating an environment including a provider network, coupled to a client device, having a content delivery service/system that utilizes one or more machine learning models to determine potential publishing parameters according to some examples.

The present disclosure relates to methods, apparatus, systems, and non-transitory computer-readable storage media for determining publishing parameters for a content delivery system. Certain examples herein are directed to a computer-implemented service that utilizes machine learning to generate and use publishing parameters for a content delivery system. Certain examples herein utilize a content provider intention match machine learning model to generate a first set of one or more potential publishing parameters for a media file (e.g., particular video and/or audio) of the content provider, and (e.g., upon receiving an indication from the content provider to modify the first set of one or more potential publishing parameters for the media file) utilize a negotiation simulation machine learning model to generate a second set of one or more potential publishing parameters for the media file (e.g., based on the indication from the content provider). In certain examples, the media file is sent to a client device based on the second set of one or more potential publishing parameters.

In certain examples, artificial intelligence (e.g., machine learning) driven methods and systems for publishing of media content are disclosed. In certain examples, these methods and/or systems are implemented for either of a demand side (e.g., content provider) and supply side (e.g., content publisher). In order to better optimize a content provider's and/or content publisher's objectives (e.g., such as maximizing revenues for the content publisher based on a number of views of the content provider's media file(s)), examples herein automate and/or more consistently generate potential publishing parameters for the media file. In certain examples, the machine learning model(s) disclosed herein improve themself through self-play simulations under a reinforcement learning framework. In certain examples, the machine learning model(s) disclosed herein provide one or more recommendations to a human for their approval (e.g., via a device of the content provider and/or content publisher). In certain examples, the machine learning model(s) disclosed herein automate part of or the entire process of generating publishing parameters that are used to send the media file to one or more client (e.g., user) devices.

Certain content publishing services, such as, but not limited to, websites, streaming services and/or streaming devices (e.g., Fire tablet), and mobile applications (e.g., free games, dating services, weather services, etc.) can monetize their inventory by selling out a portion of their inventories (e.g., available content presentation space) for hosting content from external content providers. In certain examples, publishers (e.g., as sellers) can monetize the available space (e.g., adding secondary content to primary content) in two ways: (1) they can negotiate the publishing parameters for sending a (e.g., secondary) media file to one or more client (e.g., user) devices via a deal agreement (e.g., programmatic guaranteed, direct deal, private auction, preferred deal, etc.) with the content providers (e.g., buyers of that available space) to show their content (e.g., media file(s)) or (2) they can auction off their available spaces (e.g., in real-time open auctions where content providers) can freely bid for the spaces. In certain examples, unlike the open auctions where the buying processes of the available space is programmatic and automated without direct interaction between content publishers and content providers (e.g., through automated client-server communications), certain deals are completed through 1 to 1, or 1 to many, direct interactions initiating, negotiating, and executing (e.g., signing) deals (e.g., contracts) between the parties. The interactions often happen in many different means like offline (e.g., over a lunch or coffee, email, phone call, and/or in writing involving mostly human driven negotiations between the two parties). Despite open auctions being easier and faster way to sell their inventories, certain publishers prefer selling them via deals as they may sell them on premiums and/or can lock in sales early on and have better control over who they are selling their inventories to and what they will be hosting. In certain examples, content providers buy deals as they can have prioritized access to premium inventories like non-standard and exclusive inventories, activate the presentation of their media files with pre-negotiated terms and have better control for achieving their campaign goals. However, certain deal buying processes, especially negotiation processes, are mostly manual and often relying on ability of individual deal negotiator to make optimal decisions to finalize deals in their most favorable terms. In certain examples, content publishers want to sell inventories at higher prices at reasonable or agreeable terms (e.g., deal feature packaging such as targeting, campaign flight duration, content medium type, etc.) without risking deal falling apart to maximize their sales revenues and/or other objectives such as customer (e.g., end-user) experience. In certain examples, content providers want to book available space of the content publisher at lower prices with desirable terms without risking losing to other buyers or deal falling apart to optimize their spend while reserving necessary deal features for successful campaign execution. Hence, deal negotiation performance from deals to deals may vary due to varying skill sets and knowledge among negotiators. In certain examples, user(s) from the publisher side may rely on fixed prices (e.g., rate card, fixed at least over a certain period) based on low dimensional deal types, e.g., where prices are generally not optimized for individual deals. In certain examples, each deal has different features and even a same deal can have theoretically different prices depending on market conditions (e.g., supply and demand levels). In certain examples, even deal negotiation itself can influence pricing depending on how much one party understands its counterpart's hidden intentions (and hence, relying on negotiator's ability). Thus, content publishers may not be fully maximizing their revenues due to such rigid pricing strategy. In certain examples, on the content provider side, on the other hand if the publisher implements a dynamic pricing strategy, the demand side deal maker is to be able to make optimal pricing decisions dynamically as well as to effectively and efficiently counter the publisher's deal negotiation strategy.

However, determining multiple sets of potential publishing parameters for a content publisher (e.g., content publishing service) to publish content (e.g., a media file) from a content provider is becoming increasingly difficult, e.g., based on the issues discussed at least in the paragraph above. Examples herein are directed to one or more services that implement one or more machine learning models to determine potential publishing parameters for a content publisher (e.g., content publishing service) to publish a media file of a content provider to overcome one or more of the issues discussed at least in the paragraph above.

Examples herein improve the functioning of a computer-implemented method (e.g., and a provider content delivery service) by utilizing machine learning model(s) to determine potential publishing parameters for a content publisher (e.g., content publishing service) to publish a media file of a content provider to a client (e.g., user). Examples herein improve the functioning of a computer-implemented method (e.g., and a provider content delivery service) by utilizing a content provider intention match machine learning model to generate a first set of one or more potential publishing parameters for a media file (e.g., particular video and/or audio) of the content provider, and (e.g., upon receiving an indication from the content provider to modify the first set of one or more potential publishing parameters for the media file) utilize a negotiation simulation machine learning model to generate a second set of one or more potential publishing parameters for the media file (e.g., based on the indication from the content provider). In certain examples, this removes humans from this process and overcomes the issues discussed above. In certain examples, the media file is sent to a client device based on the second set of one or more potential publishing parameters generated by the machine learning model(s).

FIG. 1 is a diagram illustrating an environment including a provider network 100, coupled to a client (e.g., user of the content delivery service/system 102) device(s) 146, having a content delivery service/system 102 that utilizes one or more machine learning models 130, 134 to determine potential publishing parameters according to some examples.

In certain examples, the provider network 100 (e.g., cloud provider) is coupled to the client device 146 (e.g., media player device) via network (e.g., distribution) service(s) 136. In certain examples, client (e.g., user) device 146 plays content from content delivery service/system 102, for example, play one or more feeds (e.g., live streams), e.g., on-demand video/audio 138 and/or linear television (TV), and/or other video/audio (e.g., scheduled) 140 (e.g., that can be viewed according to a set schedule, e.g., not on demand) (e.g., a digital billboard), e.g., sent via network (e.g., distribution) services 136. In certain examples, client device 146 is a media player device, e.g., including a decoder 148 to decode video for viewing on display 152 and/or audio for outputting on audio output (e.g., speaker) 154. In certain examples, client (e.g., media player) device 146 includes a client (e.g., and/or media player) identification (ID) 150, e.g., to uniquely identify the media player and/or client (e.g., user).

In certain examples, a content provider 124 is to send content to a content data store 122 (e.g., which may be implemented in one or more data centers). In certain examples, a content provider 124 is on site to capture video (e.g., and audio) of a live event. In certain examples, content provider 104 is to encode the resulting output and send that encoded content to one or more downstream entities (e.g., content delivery service/system 102), e.g., via one or more networks.

As one example, a media file (e.g., including a video file and audio file) (e.g., a media container) that is to be encoded is accessed from the content data store 122 by one or more content managers 104A-104B. In certain examples, the media file may be uploaded to content data store 122 by content provider(s) or provided directly (e.g., as live content) to one or more content managers 104A-104B by content provider(s) (e.g., from a live content encoder).

In certain examples, the content manager (e.g., described in reference to content manager 104A, but one or more other content managers may include one or more of the components discussed herein) controls the encoding (e.g., transcoding) of a media file into packages and files in various formats and in different sizes for distribution to end users (e.g., viewers). In certain examples, a user (e.g., separate from an end user or client) (e.g., via content publisher device 156, e.g., with content publisher requests/responses 142 sent via network services 136) creates a job for a (e.g., uncompressed) multimedia file by specifying (e.g., via a console of or an application programming interface (API) call to the content manager, e.g., a graphical user interface (GUI) 160 displayed by display 158) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio file) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to process multiple inputs in parallel. In certain examples, secondary content insertion service 118 adds secondary content (e.g., advertisement(s)) into a main content. In certain examples, encoding service 106 is to encode both the main content and secondary content, e.g., and the secondary content insertion service 122 is to insert the secondary content into the main content. In certain examples, the secondary content is from a content provider, e.g., and the request to publish the secondary content comes from content provider device 162 (e.g., via a console of or an application programming interface (API) call to the content manager, e.g., a graphical user interface (GUI) 166 displayed by display 164). In certain examples, content provider requests/responses 144 are sent via network services 136.

In certain embodiments, packaging service 116 includes one or more manifests 120, e.g., identifying the media file(s) (e.g., fragments, streams, etc.). In certain embodiments, a manifest for a particular media file (e.g., a particular title) identifies a proper subset of video and audio representations of the media file for a particular client device 146 (e.g., based on the client's media player (e.g., determined from its client ID value 150), display 152 resolution, audio output 154 capabilities, and/or available bandwidth). In certain embodiments, the content is stored in the content delivery service/system 102 in two parts: (i) the manifest 120 of all available media representations (e.g., their URL addresses and, optionally, other characteristics) and (ii) the media files (e.g., representations) (e.g., stream of fragments) in a single (e.g., container) or multiple files (e.g., in content data store 122). In certain embodiments, a client device 146 is to read a manifest 120 (e.g., sent in response to manifest request) before the client device may make a request for the media from that manifest, and thus access media files (e.g., audio fragments and corresponding video fragments) from content data store 122.

In certain embodiments, secondary content insertion service 116 adds secondary content (e.g., advertisement(s)) into a main content. In certain embodiments, encoding service 106 is to encode both the main content and secondary content, e.g., and the secondary content insertion service 116 is to insert the secondary content into the main content.

In certain examples, a campaign management service/system 126 is to manage the use (e.g., sending) of a media file (e.g., secondary content) to client (e.g., user) device(s) 146. In certain examples, provider network 100 (e.g., a campaign management service/system 126) includes a demand (e.g., content provider) side service/system 128 and/or a supply (e.g., content publisher) side service/system 132, for example, as discussed below.

In certain examples, demand (e.g., content provider) side service/system 128 includes one or more machine learning (ML) models 130 and/or a supply (e.g., content publisher) side service/system 132 includes one or more machine learning (ML) models 134, for example, as discussed below.

Figure 2:
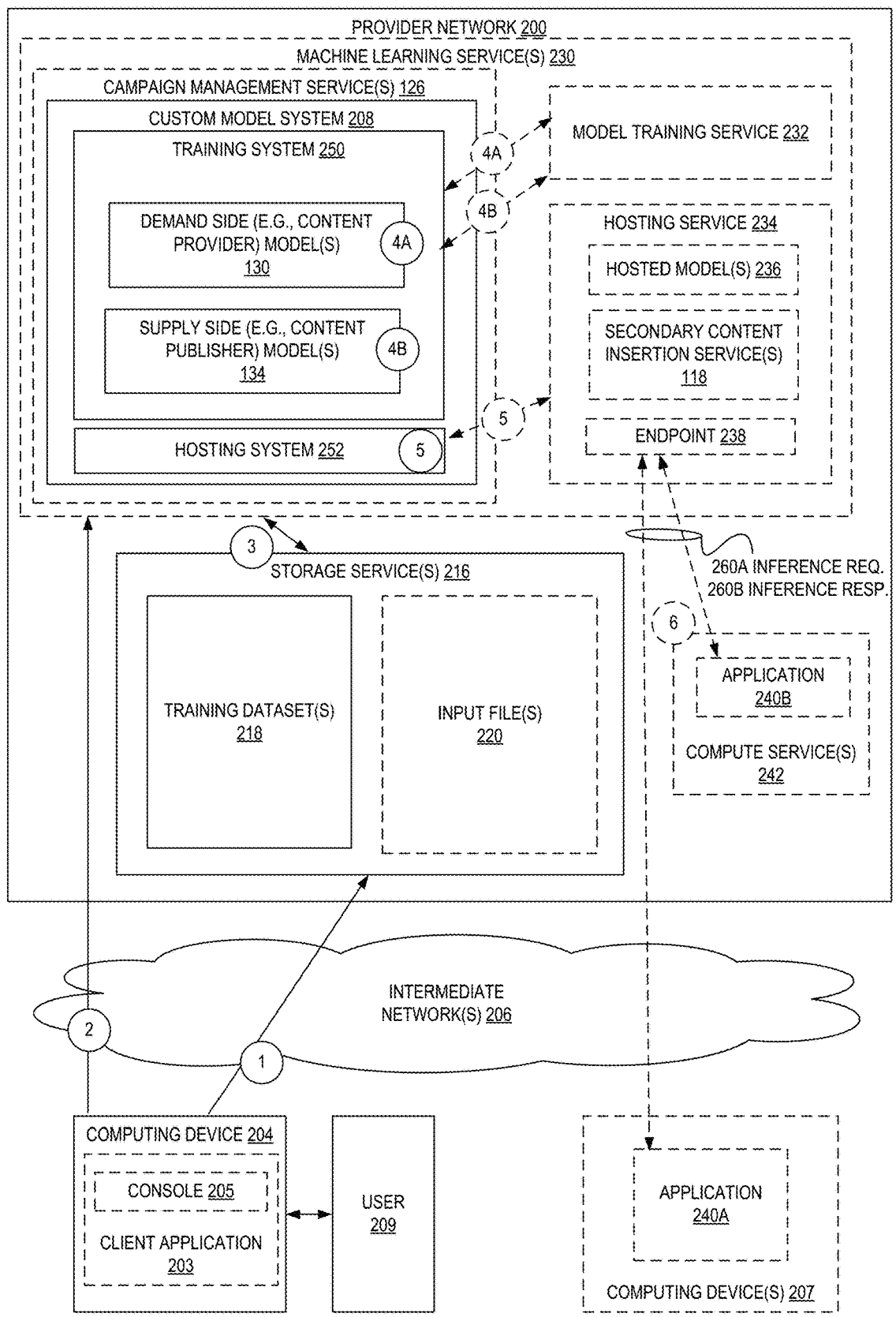
FIG. 2 is a diagram illustrating an environment for creating, training, and using one or more machine learning models according to some examples.

FIG. 2 is a diagram illustrating an environment for creating, training, and using one or more machine learning models according to some examples. FIG. 2 includes one or more campaign management services 126, one or more storage services 216, one or more machine learning services 230, and one or more compute services 242 implemented within a multi-tenant provider network 200. Each of the one or more campaign management services 126, one or more storage services 216, one or more machine learning services 230, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some examples, these resources may be maintained in a "ready" state (e.g., having a pre-initialized runtime environment configured to execute the serverless functions), allowing the serverless functions to be executed in near real-time.

The campaign management service 126, in some examples, is a machine learning powered service that provides a demand side and/or a supply side with machine learning models, e.g., to generate potential publishing parameters, for example, one or more demand (e.g., content provider) side ML models 130 and/or one or more supply (e.g., content publisher) side ML models 134, e.g., as discussed herein.

The training system 250, for example, may enable users to generate one or more machine learning models (e.g., one or more demand (e.g., content provider) side ML models 130 and/or one or more supply (e.g., content publisher) side ML models) that output results (e.g., potential publishing parameters) for an input (for example, a request to publish a media file and/or an indication from a content provider to modify the publishing parameters). In certain examples, the training system 250 enables users to generate a content provider intention match machine learning model (e.g., of the supply side) to generate a first set of one or more potential publishing parameters for a media file (e.g., particular video and/or audio) and/or (e.g., upon receiving an indication from the content provider to modify the first set of one or more potential publishing parameters for the media file) a negotiation simulation machine learning model (e.g., of the supply side) to generate a second set of one or more potential publishing parameters for the media file (e.g., based on the indication from the content provider).

Examples herein allow a customer to create one or more machine learning models 130 and/or 134 by supplying a training dataset 218 (for example, one or more sets of proposed and/or previously used publishing parameters, e.g., prior deals). Further examples of training datasets are discussed below.

In some examples, the campaign management service 126—via use of a custom model system 208—allows users to build and use one or more demand (e.g., content provider) side ML models 130 and/or one or more supply (e.g., content publisher) side ML models 134.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s), e.g., into one or more demand (e.g., content provider) side ML models 130 and/or one or more supply (e.g., content publisher) side ML models 134, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify data 218 for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the campaign management service 126 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a model 130 and/or model 134, this file (or files) may include labels corresponding to the file (e.g., publishing parameter(s), video, audio, and/or text), e.g., with a label indicating category(ies) of content in the file.

Thereafter, at circle (2) the computing device 204 may issue one or more requests (e.g., API calls) to the machine learning service 230 that indicate the user's 209 desire to train one or more algorithms into model(s), e.g., into one or more demand (e.g., content provider) side ML models 130 and/or one or more supply (e.g., content publisher) side ML models 134. The request may be of a type that identifies which type of model(s) are to be created or identifies that the machine learning service 230 itself is to identify the candidate model(s), e.g., candidate demand (e.g., content provider) side ML model 130 and/or supply (e.g., content publisher) side ML model 134. The request may also include one or more of an identifier of a storage location or locations storing the data 218, which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of any labels, etc. In some examples, the request includes an identifier (e.g., from the user 209) of the candidate algorithm(s) themselves within the request.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218, etc. Thus, the custom model system 208 may retrieve any stored data 218 elements as shown at circle (3), which may be from a storage location within the provider network 200 or external to the provider network 200.

In some examples, the training (at circle (4A) and (4B), respectively) of one or more demand (e.g., content provider) side ML models 130 and/or one or more supply (e.g., content publisher) side ML models 134, includes performing (at optional, dotted circle (4A) and (4B), respectively) by training service 232 of machine learning service 230 a particular training job (e.g., hyperparameter optimization tuning job), or the like.

In some examples, the hosting system 252 (at circle (5)) of the custom model system 208 may make use (at optional, dotted circle (5)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction, including, but not limited to, potential publishing parameters for publishing a media file (e.g., secondary content)) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user and/or viewer (e.g., in a graphical user interface of the application) and/or exported as a data structure (e.g., in a selected format). In certain examples, the inference results are utilized by a secondary content insertion service 118 to insert secondary content (e.g., an image or video) into an input file 220 and/or publish the secondary content (e.g., as part of the file 220) based at least in part on the inference results (e.g., the publishing parameter(s)).

In order to optimize a publisher's (or content provider's) configured objectives when selling (or buying) content publication, examples herein utilize an artificial intelligence (AI) driven (e.g., ML driven) demand (e.g., content provider) side service/system 128 (e.g., that includes one or more machine learning (ML) models 130) and/or a supply (e.g., content publisher) side service/system 132 (e.g., that includes one or more machine learning (ML) models 134). In certain examples, demand (e.g., content provider) side service/system 128 that includes one or more machine learning (ML) models 130 and/or a supply (e.g., content publisher) side service/system 132 that includes one or more machine learning (ML) models 134 is a partially automated system where an ML model(s) provides recommendations to human deal negotiator throughout an entire deal life cycle (for example, from creation to contract signing, e.g., the negotiation part (e.g., deal packaging and pricing) and/or the ML model(s) replace most or all of human touch points in the process automating the entire process.

Figure 3:
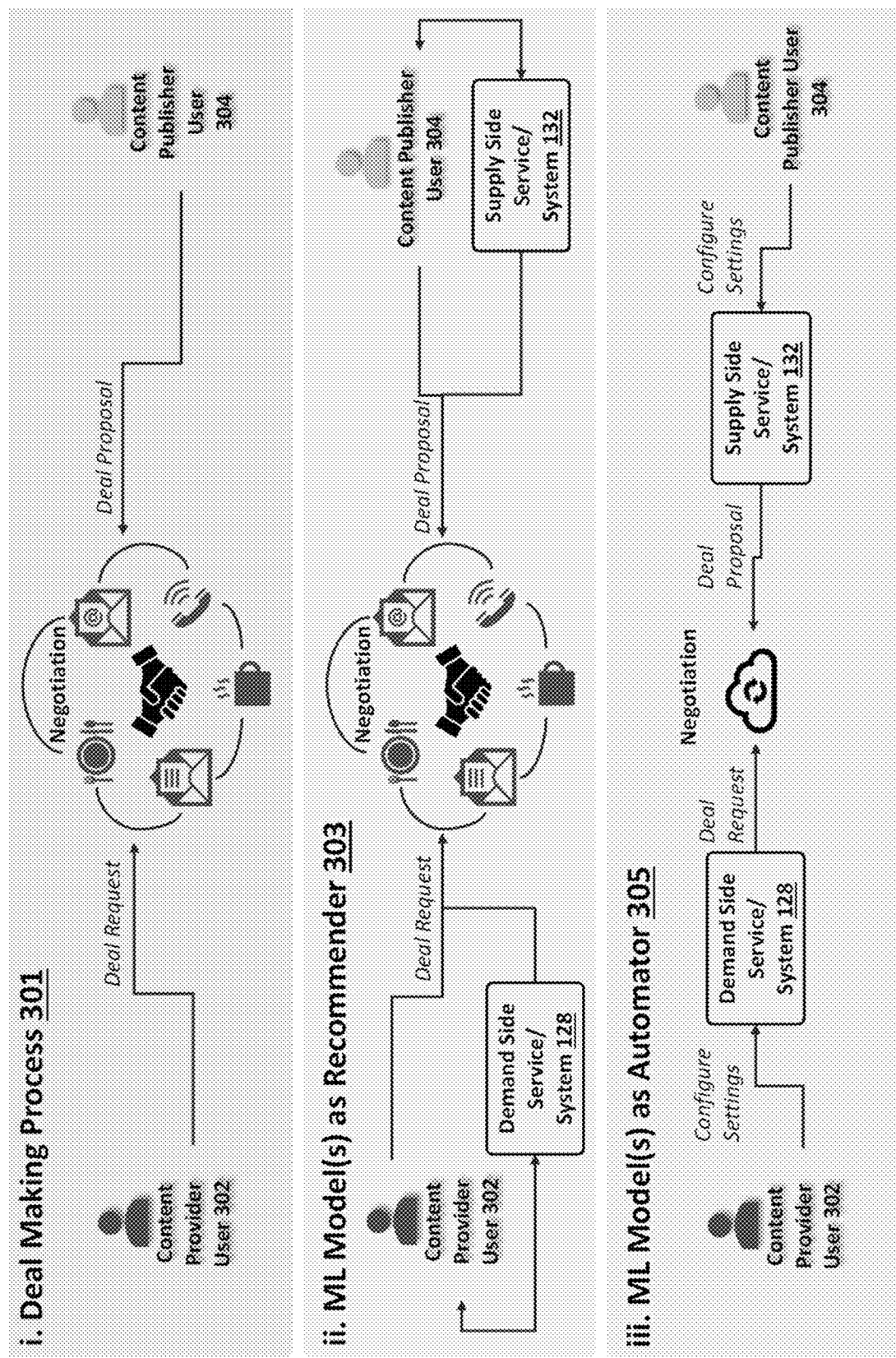
FIG. 3 is a diagram illustrating flows for (i) a deal making process, (ii) using one or more machine learning models as a recommender, and (iii) using one or more machine learning models as an automator according to some examples.

FIG. 3 is a diagram illustrating flows for (i) a deal making process, (ii) using one or more machine learning (ML) models as a recommender, and (iii) using one or more machine learning models as an automator (e.g., that performs an operation without manual intervention) according to some examples. For example, in certain examples, the ML models according to this disclosure are utilized for or to replace a negotiation process. In certain examples, content publishers and/or content providers use one or more secondary content management technologies such as a supply side platform (SSP), demand-side platform (DSP), and/or secondary content servers to manage their inventories/campaigns and execute sales and deliveries. In certain examples, demand (e.g., content provider) side service/system 128 that includes one or more machine learning (ML) models 130 and/or a supply (e.g., content publisher) side service/system 132 that includes one or more machine learning (ML) models 134 are integrated into any of those technologies to facilitate automated or partially automated deal negotiations.

In FIG. 3, (i) deal making process 301 depicts a deal transaction process between a content provider user 302 and a content publisher user 304, e.g., where demand side and supply side users negotiate (e.g., off any secondary content technology platform).

In FIG. 3, (ii) using one or more machine learning (ML) models as a recommender 303 depicts using demand (e.g., content provider) side service/system 128 that includes one or more machine learning (ML) models 130 and/or a supply (e.g., content publisher) side service/system 132 that includes one or more machine learning (ML) models 134 as a recommender which provides various decision-making recommendations (e.g., recommends potential publishing parameters) throughout a negotiation process, e.g., but it is still the users 302, 304 who will make final decisions manually, hence, a semi-automatic system. Also, the deal makers may still perform off-platform negotiations.

In FIG. 3, (iii) using one or more machine learning models as an automator 305 depicts using demand (e.g., content provider) side service/system 128 that includes one or more machine learning (ML) models 130 and/or a supply (e.g., content publisher) side service/system 132 that includes one or more machine learning (ML) models 134 as an automation of the entire process, e.g., there are no direct interactions between the demand side users (e.g., content provider user 302) and supply side users (e.g., content publisher user 304) (e.g., though the parties can still connect off-platform) leaving the negotiation system to take care of it completely. In certain examples, demand (e.g., content provider) side service/system 128 that includes one or more machine learning (ML) models 130 can be used separately from a supply (e.g., content publisher) side service/system 132 that includes one or more machine learning (ML) models 134, e.g., each service/system can be used by just one party (e.g., provider or publisher) and does not require both parties to use their own systems for them to operate.

In certain examples, one or both of demand (e.g., content provider) side service/system 128 that includes one or more machine learning (ML) models 130 and/or a supply (e.g., content publisher) side service/system 132 that includes one or more machine learning (ML) models 134 includes a GUI, e.g., demand (e.g., content provider) side GUI 166 and/or supply (e.g., content publisher) side GUI 160.

Figure 4:
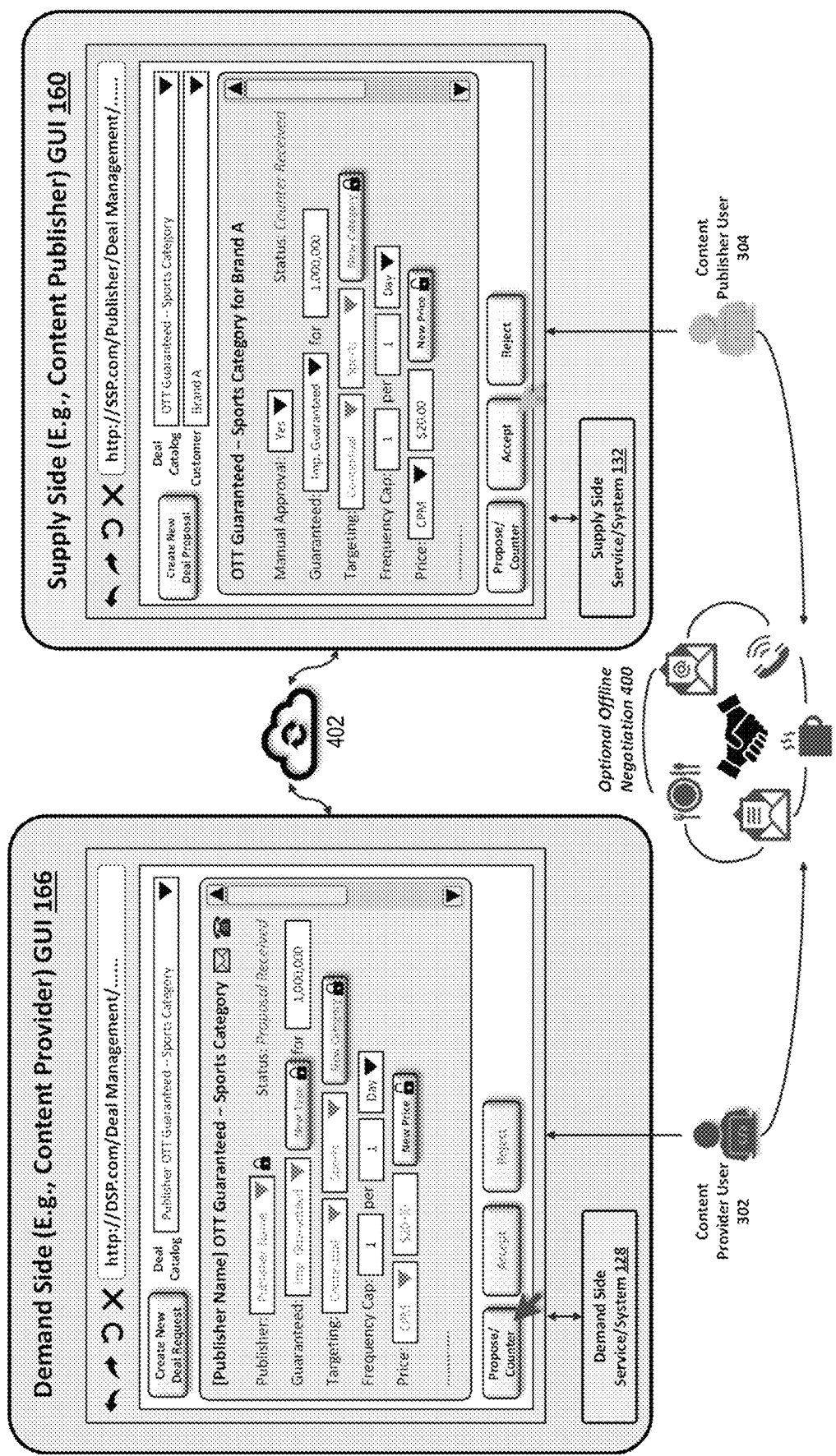
FIG. 4 is a diagram illustrating a demand side (e.g., content provider) graphical user interface (GUI) coupled to a demand side service/system and a supply side (e.g., content publisher) GUI coupled to a supply side service/system according to some examples.

FIG. 4 is a diagram illustrating a demand side (e.g., content provider) graphical user interface (GUI) 166 coupled to a demand side service/system 128 and a supply side (e.g., content publisher) GUI 160 coupled to a supply side service/system 132 according to some examples.

In certain examples, demand (e.g., content provider) side GUI 166 includes one or more interface elements, e.g., to allow content provider user 302 to select certain operations. In certain examples, content provider user 302 may click an interface element to (e.g., cause a command to be sent that causes) cause demand (e.g., content provider) side service/system 128 to perform one or more operations (e.g., to perform one or more inferences with one or more machine learning (ML) models 130).

In certain examples, supply (e.g., content publisher) side GUI 160 includes one or more interface elements, e.g., to allow content publisher user 304 to select certain operations. In certain examples, content publisher user 304 may click an interface element to (e.g., cause a command to be sent that causes) cause supply (e.g., content publisher) side service/system 132 to perform one or more operations (e.g., to perform one or more inferences with one or more machine learning (ML) models 134).

An interface element, may include, but is not limited to, a thumbs up (or down), checkbox, button, dropdown menu, etc.

In certain examples, the demand (e.g., content provider) side service/system 128 that includes one or more machine learning (ML) models 130 communicates with the supply (e.g., content publisher) side service/system 132 that includes one or more machine learning (ML) models 134 via network 402. In certain examples, optional offline negotiations may be performed separately from demand (e.g., content provider) side service/system 128 and supply (e.g., content publisher) side service/system 132.

In certain examples, demand (e.g., content provider) side service/system 128 that includes one or more machine learning (ML) models 130 and/or a supply (e.g., content publisher) side service/system 132 that includes one or more machine learning (ML) models 134 are integrated into secondary content insertion technologies that publishers and providers utilize, e.g., with changes to deal management user interfaces (UIs).

In certain examples, on the demand (e.g., content provider) side, a user can either choose one from the list of available deals by various publishers or can request for a new custom deal if the desired deal type is not available in the list.

In certain examples, supply (e.g., content publisher) side service/system 132 that includes one or more machine learning (ML) models 130 automatically updates pricing and other negotiable terms (e.g., on a GUI) and the content publisher user 304 can make an appropriate next decision or let the supply (e.g., content publisher) side service/system 132 that includes one or more machine learning (ML) models 134 negotiate on their behalf, e.g., and the content publisher user makes a final approval at the end of the negotiation.

In certain examples, demand (e.g., content provider) side service/system 128 that includes one or more machine learning (ML) models 130 automatically updates pricing and other negotiable terms (e.g., on a GUI) and the content provider user 302 can make an appropriate next decision or let the demand (e.g., content provider) side service/system 128 that includes one or more machine learning (ML) models 130 negotiate on their behalf, e.g., and the content provider user makes a final approval at the end of the negotiation.

The remaining portion of this detail description discussed examples in the context of content publishers, but one of ordinary skill in the art should understand that similar uses are foreseen for content providers.

Figure 5:
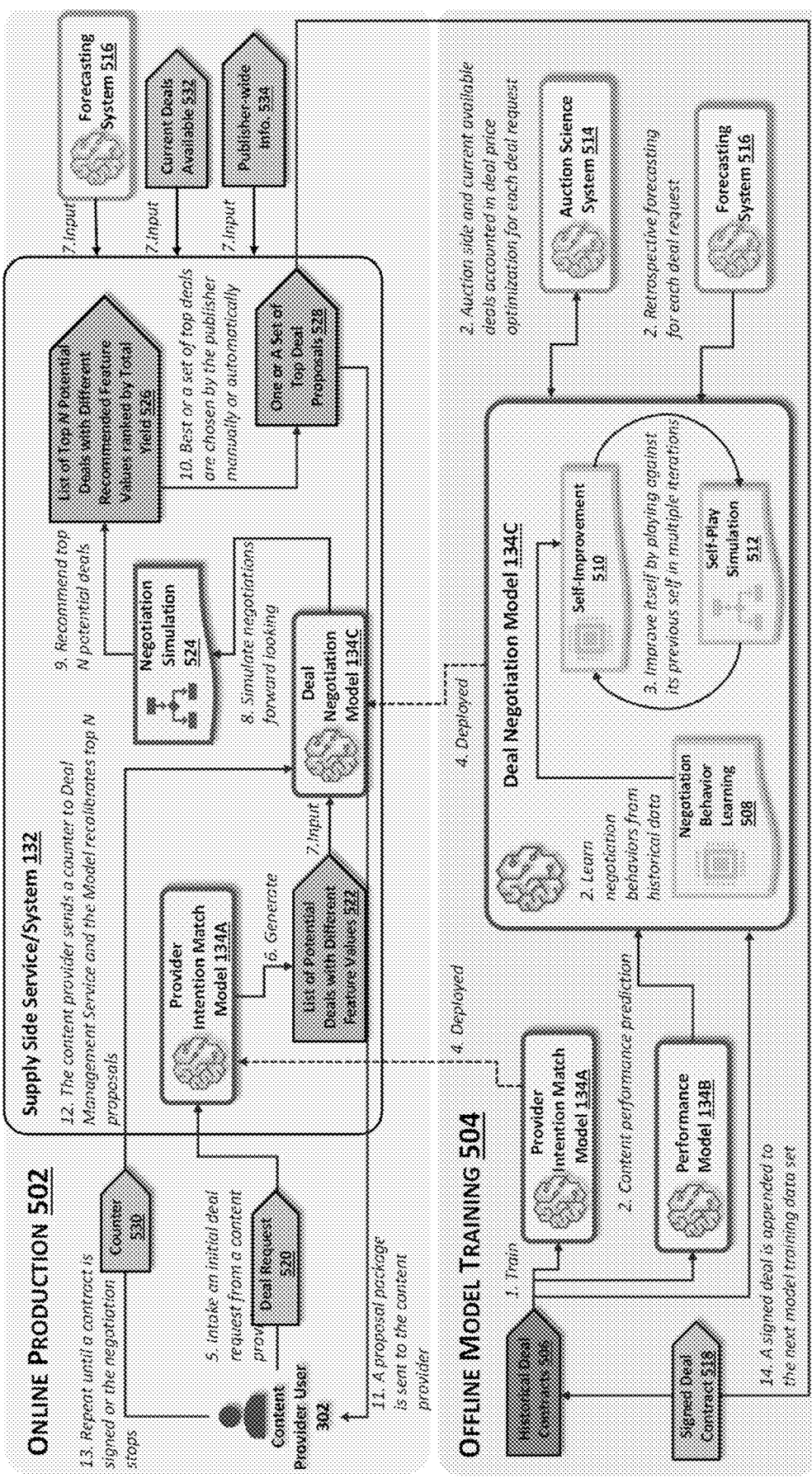
FIG. 5 is a diagram illustrating an offline machine learning model training and an online production for a supply side (e.g., content publisher) service/system that includes a provider intention match machine learning model and a deal negotiation machine learning model (e.g., including a negotiation simulation machine learning model) according to some examples.

FIG. 5 is a diagram illustrating an offline machine learning model training 504 and an online production 502 for a supply side (e.g., content publisher) service/system 132 that includes a provider intention match machine learning model 134A and a deal negotiation machine learning model 134C (e.g., including a negotiation simulation machine learning model 524) according to some examples.

In certain examples, offline model training 504 (e.g., system) (e.g., as part of supply side (e.g., content publisher) service/system 132) is to first (1) train provider intention match ML model 134A. In certain examples, the objective of the content provider intention match ML model 134A is to predict and list a set of initial potential deal proposals with differing features (e.g., potential publishing parameters, e.g., as shown in GUI 160 in FIG. 4) for a publisher, e.g., based on limited information provided by content providers when they contact the publisher for custom deals (and not chosen from the list of publishers' predefined deals). In certain examples, the predicted proposals will hence reflect who the content provider is and what type of campaign it intends to run. In certain examples, the content provider intention match ML model 134A provides the benefits of: (i) generating an initial set of relevant deal proposals (e.g., potential publishing parameters) for easier and faster deal creation for the publisher, and (ii) limits deal feature spaces for efficient deal recommendation processing by the system. For example, if a content provider is a Content "X" retailer, the system may (or may not) assess a certain movie or TV series fan as a potential targeting audience candidate. In certain examples, content provider intention match ML model 134A is trained based on historical deal contracts data 506.

Figure 6:
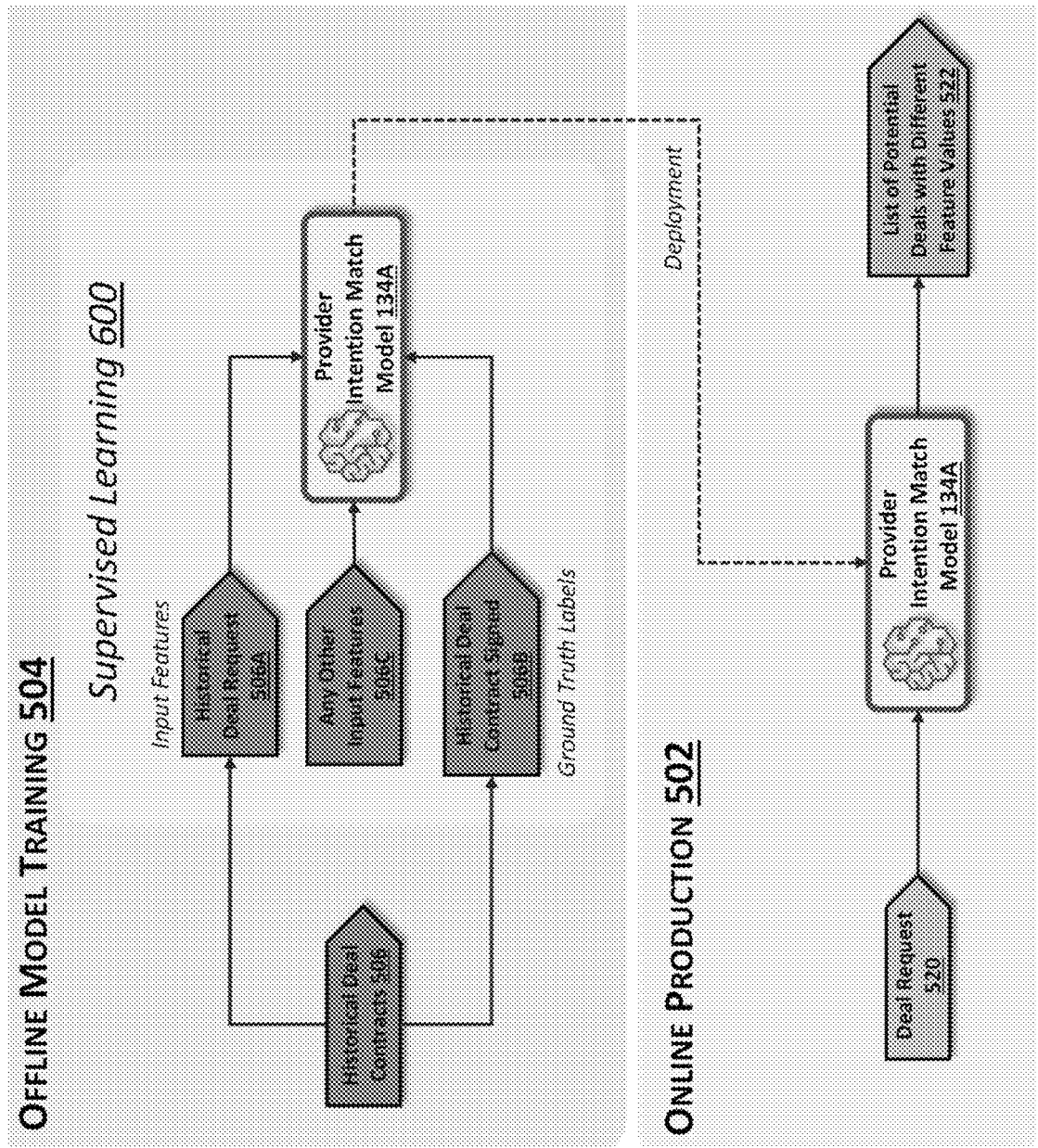
FIG. 6 is a diagram illustrating an offline machine learning model training and an online production for a provider intention match machine learning model according to some examples.

FIG. 6 is a diagram illustrating an offline machine learning model training 504 and an online production 502 for a provider intention match machine learning model 134A according to some examples. In certain examples, historical deal request data 506A, signed contract deal specifications 506B, and/or any other potential input features 506C (e.g., target audience, previous campaigns for a certain content provider, media file length, price to publish, etc.) are input features (e.g., as ground truth labels) to the content provider intention match ML model 134A.

In certain examples, for demand-side (e.g., content provider) workflows, there is an extra step where similarity scores are calculated between the output of the provider intention match machine learning model 134A and available deals by one or more publishers, e.g., to automate the manual process of going through the list of available deals to find desired deals that match the content provider's request. In certain examples, if none of the existing deals have high enough match scores, the content provider can submit a request to a publisher and on their side, the provider intention match machine learning model 134A can ingest it and then generate a set of initial deal proposals (e.g., initial potential publishing parameters).

In certain examples, the provider intention match machine learning model 134A is hosted on supply-side technology serving multiple publishers, e.g., where data from multiple publishers is available.

In certain examples, publishers can choose whether the provider intention match machine learning model 134A will be trained based only on its data or via cross-publisher data (e.g., depending on individual publisher privacy agreements).

Returning to FIG. 5, offline model training 504 (e.g., system) (e.g., as part of supply side (e.g., content publisher) service/system 132) is at (2) and (3) to train deal negotiation ML model 134C. In certain examples, deal negotiation ML model 134C includes multiple sub-components, for example, negotiation behavior learning model 508, self-improvement learning model 510, and/or self-play simulation learning model 512.

Figure 7:
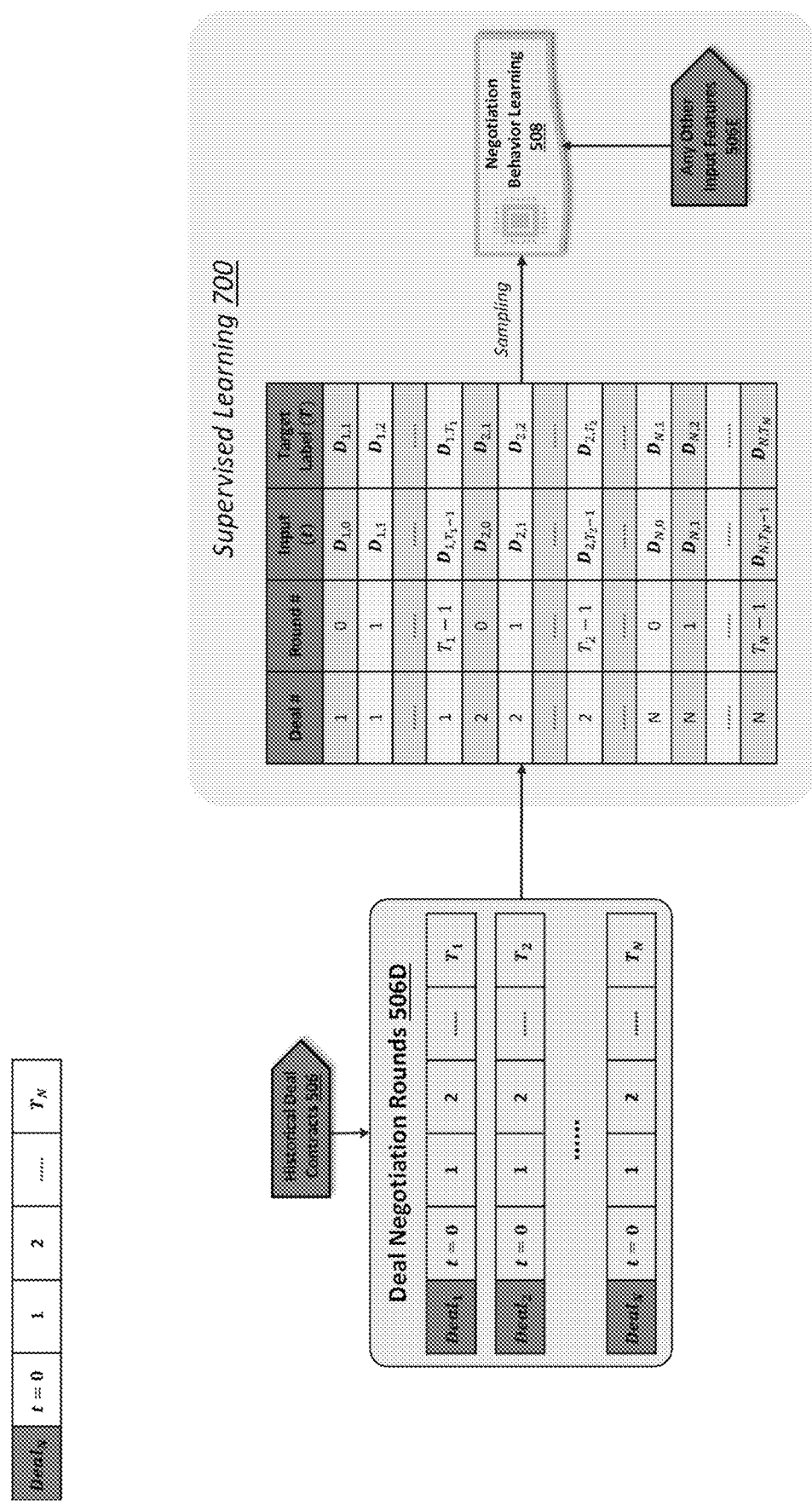
FIG. 7 is a diagram illustrating a supervised learning for a negotiation behavior learning machine learning model according to some examples.

FIG. 7 is a diagram illustrating a supervised learning for a negotiation behavior learning machine learning model 508 according to some examples. In certain examples, the negotiation behavior learning model 508 is trained to learn negotiation behaviors such as, but not limited to, general content provider counter behaviors when given a proposal with specific details and a price trade trend for a deal with specific attributes). In certain examples, the negotiation behavior learning model 508 will predict, at a round tt in a specific deal negotiation, deal counter details for a future round TT where (TT>tt), given a counterpart's proposal. In certain examples, TT can be the next round (tt+1) or can be the final round (e.g., acceptance/agreement round) depending on a model specification (in FIG. 7 is an example where TT=tt+11). In certain examples, and $DD_{X,Y}$=a deal specific vector (for example, features, such as, but not limited to, pricing and other negotiable terms) for deal X and round Y in its negotiation back-and-forth, e.g., $DD_{1,1}$=a deal specific vector for deal 1 and round 1 of negotiations.

In certain examples, negotiation behavior learning model 508 is trained in supervised learning based on historical deal contract data 506. In certain examples, additional input features 506E (e.g., forecasted data from forecasting system 516) may also be used.

In certain examples, self-improvement learning model 510 (e.g., based on the negotiation behavior learning model 508) (e.g., initializing model weights), is trained and it will (e.g., continuously) improve itself to be a better negotiator for the publisher (e.g., higher deal success rate at a higher price point) from playing against itself from the previous round in a reinforcement learning framework. In certain examples, the self-improvement learning model 510 is similar to the negotiation behavior learning model 508, e.g., where negotiation behavior learning model 508 is trained to predict a future next (e.g., it could be the next round or the final round) likely negotiation move based on observed human behaviors in the historical data 506, the self-improvement learning model 510 is to predict a best future next move to take to optimize the publisher's specified objectives. In certain examples, a reward will be a function of publisher specified objectives such as, but not limited to, yield, customer experience, and secondary content delivery performance. In certain examples, while some objectives can be quantified at the time of contract signing (e.g., at round TT) such as yield, other objectives such as customer experience and secondary content delivery performance can (e.g., only) be measured post-campaign, e.g., which may be months after the contract is executed (e.g., where a contract is executed months before actual campaigns are planned to go on). In certain examples, self-play simulation learning model 512 is to estimate those delayed objective measures.

In certain examples, performance ML model 134B is a multifunctional group of high-level predictive models that does estimation of these delayed key performance indicators based on learnings from the historical data 506. In certain examples, historical data 506 includes any relevant historical data, e.g., not just limited to deal negotiation related information. For demand-side systems, performance ML model 134B may also predict campaign performance such as, but not limited to, lifts on conversions.

In certain examples, deal negotiation model 134C is to utilize self-play simulation learning model 512 to recalibrate itself with updated model coefficients by playing against itself as trained in the previous round repeatedly until certain conditions are met (e.g., X rounds, performance improvement rate threshold, etc.). In certain examples, for each round of self-play, more than one negotiation simulation (K) may be conducted, e.g., along with other measures such as, but not limited to, regularization to prevent overfitting. Various different simulation techniques such as Monte Carlo Tree Search can be utilized. In certain examples, each round of self-play by self-play simulation learning model 512 generates a new batch of synthetic data, e.g., which will then be used to recalibrate the model weights.

Figure 8:
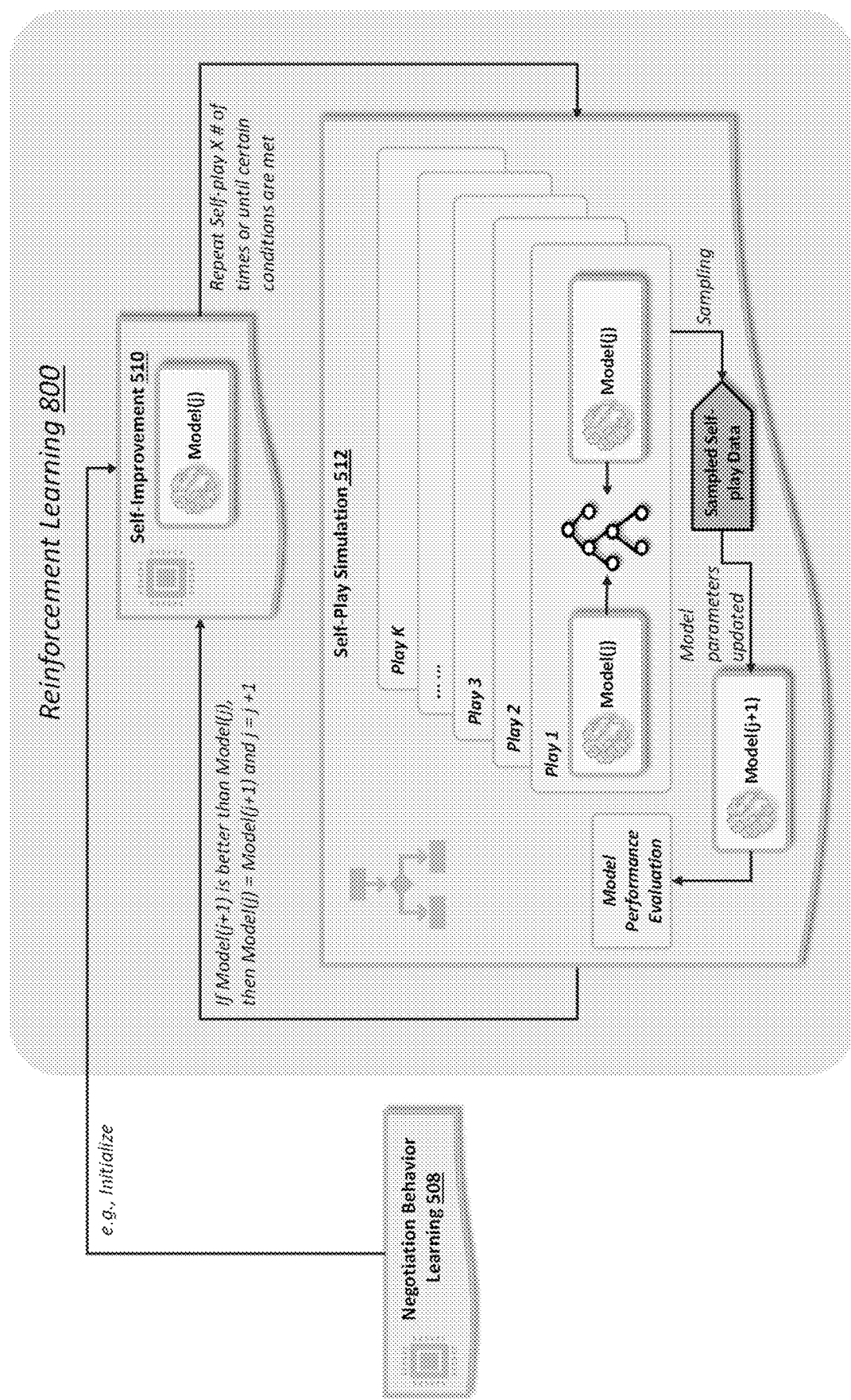
FIG. 8 is a diagram illustrating a reinforcement learning for a self-improvement machine learning model via self-play simulation according to some examples.

FIG. 8 is a diagram illustrating a reinforcement learning for a self-improvement machine learning model 510 via self-play simulation according to some examples. In certain examples, after performing evaluation such as playing the new model (e.g., model 134C) against the current model (e.g., model 134C) several times and determining its performance, if the new model outperforms the current model, it becomes the new current model (e.g., model 134C) and the next round of self-play simulation is conducted as shown in FIG. 8. As a content provider and a publisher may overall share different sets of objectives, and thus, different reward functions, in certain examples, a set of two models will be trained and play each other for each simulation round (e.g., one for the content provider and the other for the publisher) and evaluate against its counter part's previous round model.

In certain examples, when training the deal negotiation model 134C, auction side behaviors and already existing deal contracts are accounted for, e.g., with the auction side behaviors accounted for by calling an external auction science system 514 (e.g., not bound to be in specific configurations as long as it can return performance results of open auctions under same conditions (e.g., demand, supply, existing deals, etc.) that are being simulating against. In certain examples, both demand and supply forecasting data from forecasting system 516 are accounted for. In certain examples, supply forecasting is done to estimate how much supply would be available for the deal in negotiation and potential deals coming in and demand forecasting would be needed to estimate how much demand will arrive near or further future. In certain examples, both will be input to optimize yield and/or other objectives that the publisher specifies. In certain examples, on-going parallel negotiations (e.g., not just expected demand) for the same deal or the supply would also be input to the deal negotiation model 134C as they can influence the negotiation such as higher pricing given higher demand.

In certain examples (e.g., times) a publisher will not have enough machine-readable historical deal information, but instead of waiting for them to accumulate data before the deal recommendation system can be built for them, the data-based learning phase is skipped and directly move on to building purely AI based deal negotiation model by playing against itself given specified configurations repeatedly until certain conditions are met.

In certain examples, the deal negotiation model 134C will start with focusing on negotiation factors that are part of a negotiated contract itself and/or from which it can more or so directly be deduced the content provider's intention. Such factors may include deal feature details, content provider details and its history, campaign details, and some negotiation specific contexts like a number of counter proposals that will be accepted. In certain examples, direct deal negotiation involves multiple rounds of back and forth via (e.g., written) communication between the two counterparts of the negotiation, communication dialogues themselves can also provide additional information to understand each other's hidden intentions during the negotiation. In certain examples, a counter part's attitudes and emotions reflected in dialogues can help the AI agent and the publisher understand the other side's intention and where the mutual interests lie so its counter offer can more quickly lead to an agreement. Natural language processing models can be utilized to generate features based on the utterances (e.g., dialogues). Note also that in examples where it is an AI agent for the provider and an AI agent of the publisher, the task may no longer be an effective negotiation feature.

Returning to FIG. 5, online production 502 (e.g., system) (e.g., as part of supply side (e.g., content publisher) service/system 132) is at (4) to deploy the offline trained model(s) to the production environment, e.g., the provider intention match model 134A and/or the deal negotiation model 134C.

In certain examples, supply side (e.g., content publisher) service/system 132 includes (i) a deployed content provider intention match model 134A, (ii) deployed deal negotiation model 134C, and/or (iii) online negotiation simulation 524 model, e.g., to further strengthen real time negotiation recommendation. In certain examples, at (5), content provider (e.g., content provider user 302) contacts the publisher with an initial deal request 520 for the content provider. In certain examples, a demand (e.g., content provider) side may draft a request from scratch or choose one from publisher's catalog of predefined deals.

In certain examples, at (6), content provider intention match model 134A ingests the request 520, e.g., and outputs a list 522 of potential deals with different but limited feature values relevant to the content provider and its intended campaign.

In certain examples, at (7)-(9), deal negotiation model 134C ingests the list 522, runs simulations, and recommends top N (e.g., any integer) potential deals 526, for example, with different recommended features, e.g., ranked by their total yield (or other metrics or in some combinations as configured by the publisher). In certain examples, an additional simulation step is introduced to further strengthen outgoing proposals and/or generate a list of candidate proposals if the content provider intention match model 134A generates a single best proposal by its design.

In certain examples, at (10), the publisher either manually chooses or had already configured for automated choosing of one or a set of top deal proposals 528. One example for auto-selection configuration would be choosing the top ranked deal candidate based on a combination of highest possible sales revenue forecasted for that publishing and/or below a customer experience/fatigue threshold.

In certain examples, at (11), the proposal package 528 is sent to the demand side, e.g., content provider (e.g., demand (e.g., content provider) side service/system 128).

In certain examples, at (12), the demand side (201) either accepts one deal or counters with a modified proposal 530 back to the publisher, e.g., supply side (e.g., content publisher) service/system 132.

In certain examples, deal negotiation model 134C ingests the counter proposal 530 and generates a new set of potential deal proposals 526.

In certain examples, at (13), this is repeated until an agreement is reached (e.g., deal contract is signed) or the negotiation stops (e.g., either one of or both parties stop).

In certain examples, at (14) the signed contract data 518 is appended to the next model training data set.

Figure 9:
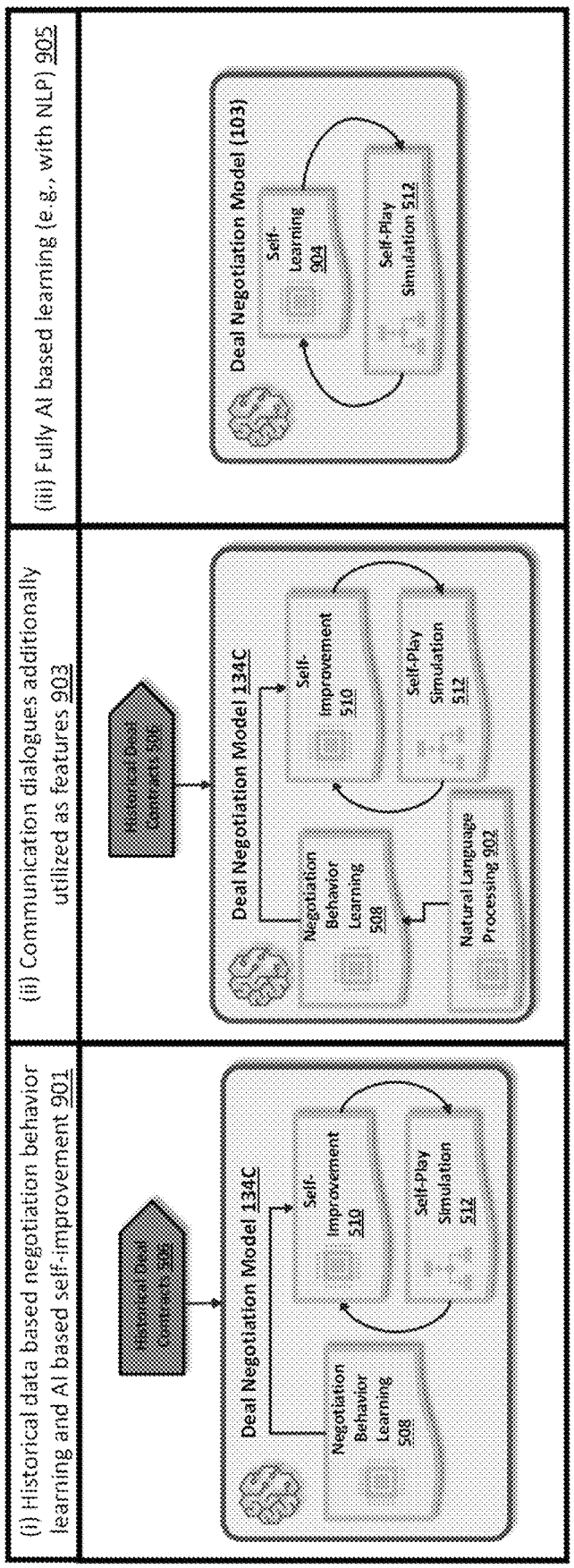
FIG. 9 is a diagram illustrating different learning flows for a deal negotiation model that (i) uses historical data based negotiation behavior learning and artificial intelligence (AI) based self-improvement, (ii) additionally uses communication dialogues (e.g., via a natural language processing machine learning model) as features, and (iii) uses fully AI based learning according to some examples.

FIG. 9 is a diagram illustrating different learning flows for a deal negotiation model that (i) uses historical data based negotiation behavior learning and artificial intelligence (AI) based self-improvement 901, (ii) additionally uses communication dialogues (e.g., via a natural language processing machine learning model) as features 903, and (iii) uses fully AI based learning 905 according to some examples.

Figure 10:
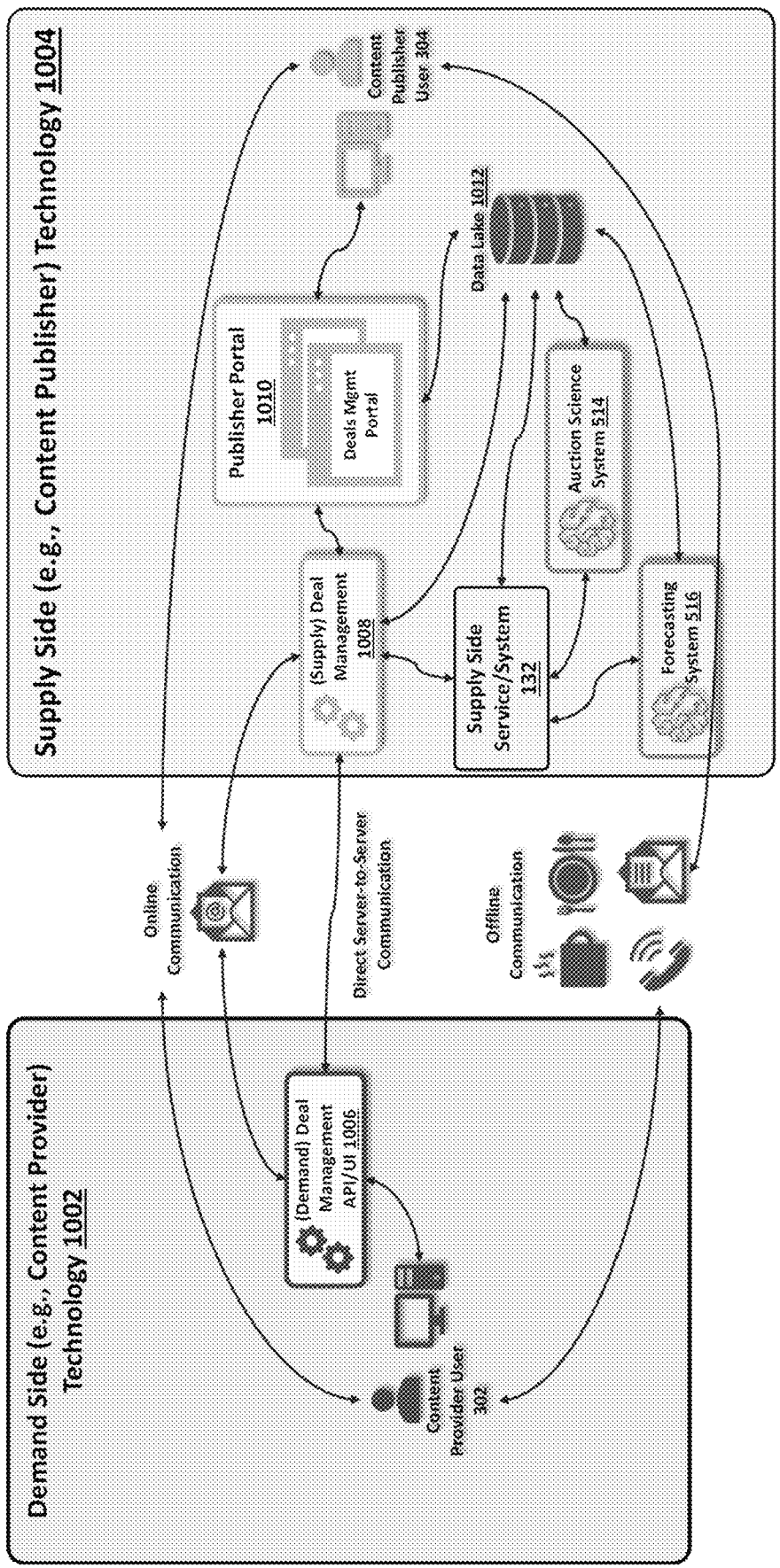
FIG. 10 is a diagram illustrating supply side (e.g., content publisher) technology that includes a supply side (e.g., content publisher) service/system and a demand side (e.g., content provider) technology that includes a (demand) deal management application programming interface (API)/user interface (UI) according to some examples.

FIG. 10 is a diagram illustrating supply side (e.g., content publisher) technology 1004 that includes a supply side (e.g., content publisher) service/system 132 and a demand side (e.g., content provider) technology 1002 that includes a (demand) deal management application programming interface (API)/user interface (UI) 1006 according to some examples.

As an example of an infrastructure workflow, demand side (e.g., content provider) initiates a deal negotiation process, for example, either by directly communicating a deal request (e.g., deal request 520 in FIG. 5) to the supply side (e.g., content publisher) (i) over online channels (e.g., email), (ii) via offline channels (e.g., writing, coffee meeting, meal meeting, and/or phone call), and/or (iii) via server-to-server communication without direct interaction between the two parties.

In certain examples, a deal request can be submitted in various different ways depending on content publisher's and content provider's content (e.g., secondary content) technology setups/utilizations. In certain examples, deal requests are not required to be submitted to a content publisher in a specific way, e.g., as long as the deal request information gets recorded to the content publisher's technology 1004 stack (for example, including data storage, e.g., data "lake" 1012).

Figure 11:
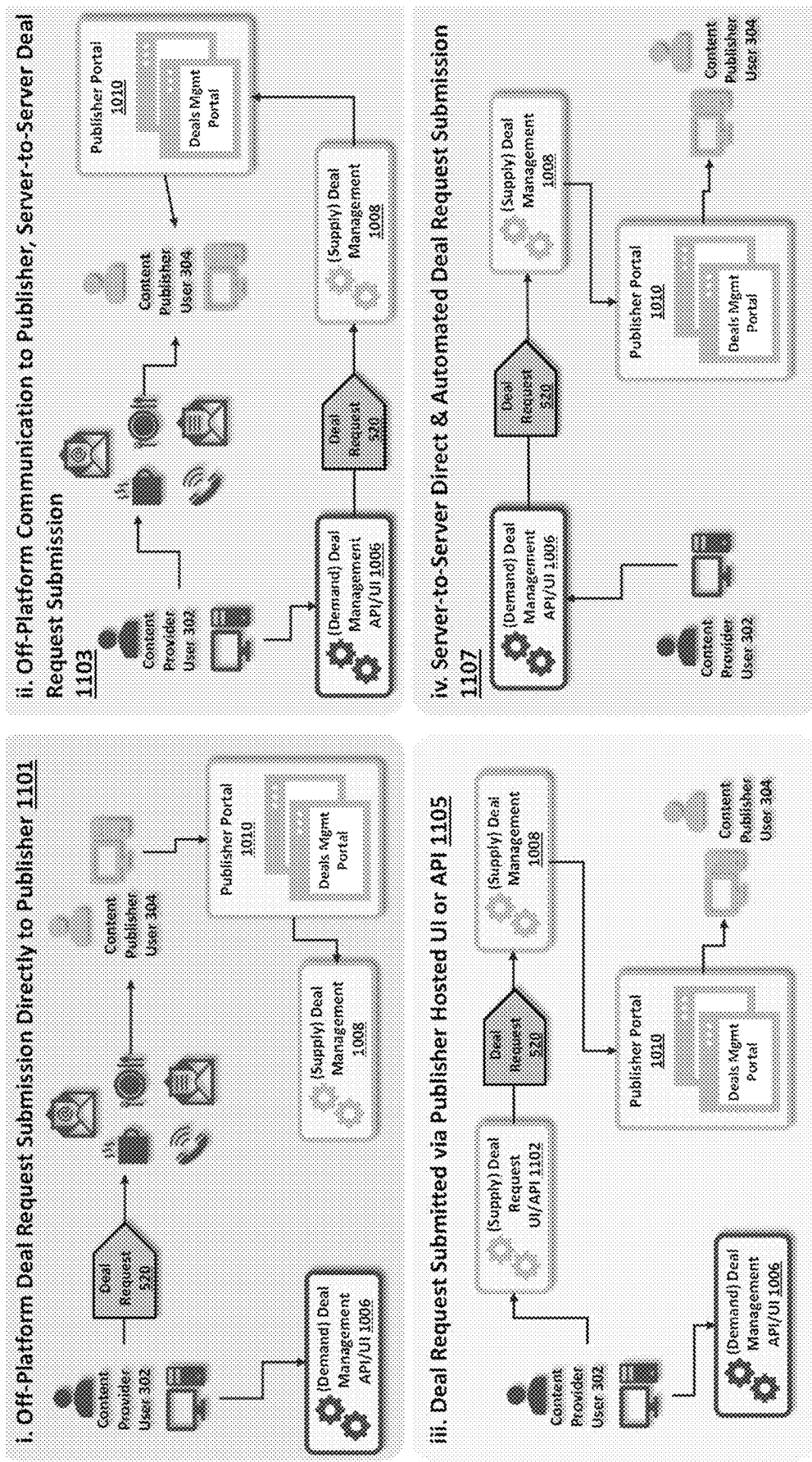
FIG. 11 is a diagram illustrating content provider deal request workflows according to some examples.

FIG. 11 is a diagram illustrating content provider deal request workflows according to some examples. In particular, FIG. 11 illustrates four different ways to submit deal requests as examples:

i. Off-Platform Deal Request Submission Directly to Publisher 1101

In certain examples, whether a demand-side drafted anew request from scratch or chose one from publisher's catalog of predefined deals, it submits the request to the publisher by communicating off-platform, e.g., via email, phone call, writing, or in person (e.g., over coffee or at a meal). In certain examples, the publisher enters the deal request information to its deal management system 1008 (e.g., via API or UI such as a publisher portal 1010).

ii. Off-Platform Communication to Publisher, Server-to-Server Deal Request Submission 1103

In certain examples, while a demand-side communicates its intention of submitting a deal request to a publisher, a formal deal request is submitted via direct server-to-server data transmitting of deal request info from demand side technology (e.g., demand side service/system 128) to publisher-side technology (e.g., supply side service/system 132).

iii. Deal Request Submitted Via Publisher Hosted UI or API 1105

In certain examples, a publisher provides an UI or API 1102 that a demand-side deal maker can use to enter deal request information. In certain examples, once done, the deal request data is transmitted to the publisher' deal management system 1008 and in turn, displays (at least some of) the information to the publisher via a publisher portal 1010. In certain examples (e.g. in parallel with the above), the two parties can continuously communicate over different channels if further communication is needed or desired.

iv. Server-to-Server Direct & Automated Deal Request Submission 1107

In certain examples, a demand-side deal maker sets up a direct server-to-server communication with a publisher, e.g., skipping all interactions between the two parties though nothing prevents them from interacting.

Turning again to FIG. 10, in certain examples, upon receipt of a deal request (e.g., deal request 520 in FIG. 5), a deal management system 1008 calls supply side (e.g., content publisher) service/system 132 (e.g., a deal negotiation model 134C thereof), e.g., which generates a first list of top proposal candidates (e.g., which can be viewed by the publisher via a publisher portal 1010). In certain examples, then, the publisher (e.g., via a configuration for an automatic response or manually) chooses one or more deal proposals and a deal package (e.g., proposal package 528 in FIG. 5) is sent to the demand side. In certain examples, this workflow is repeated until reaching a stopping point, e.g., a contract is signed or the negotiation stops (e.g., either one of or both parties stop negotiating).

Figure 12:
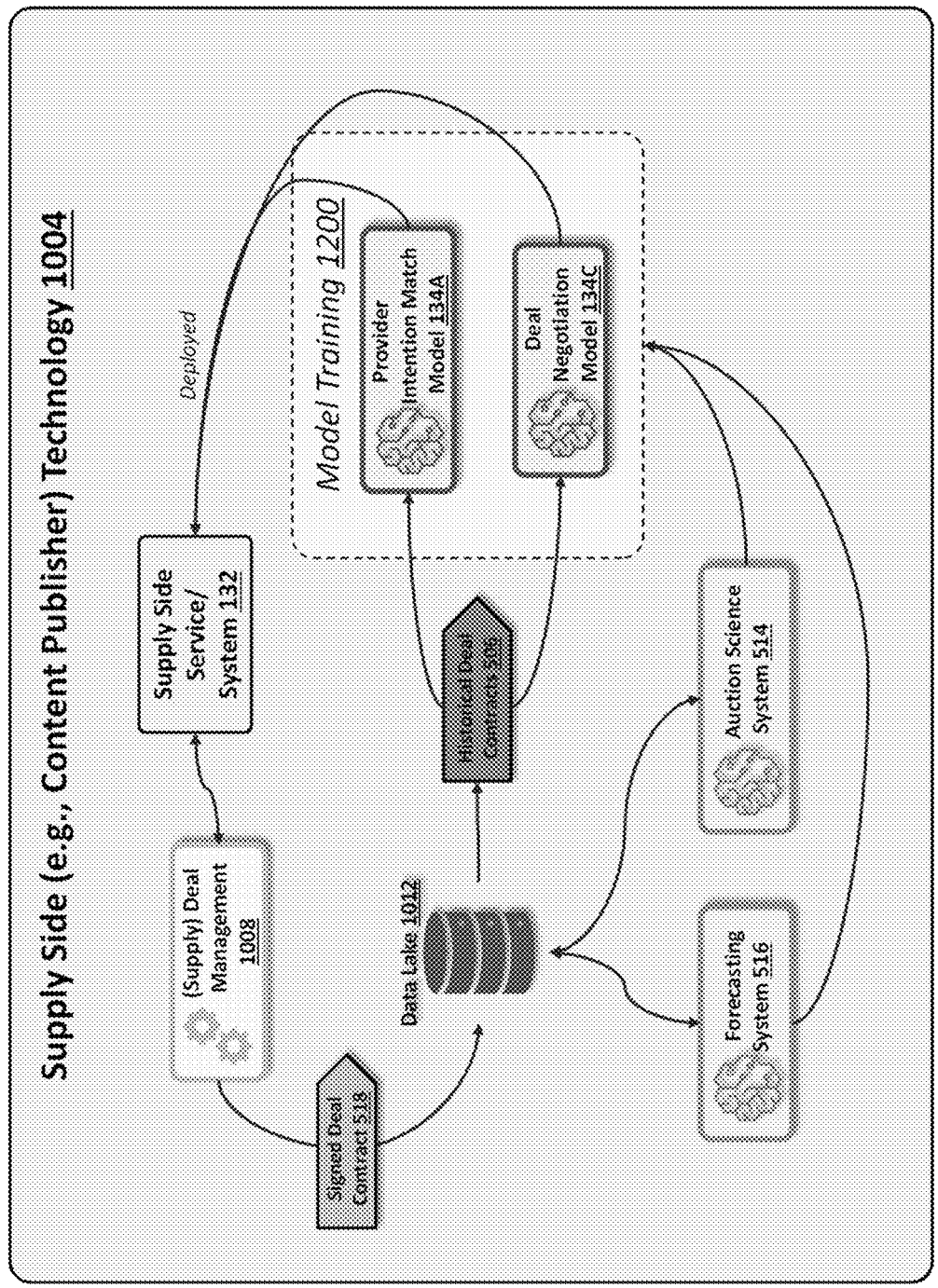
FIG. 12 is a diagram illustrating supply side model training infrastructure flow according to some examples.

FIG. 12 is a diagram illustrating supply side model training infrastructure flow according to some examples. FIG. 12 includes training 1200 of the provider intention match model 134A and/or deal negotiation model 134C.

In certain examples, the one or more machine learning (ML) models 134 of the supply side (e.g., content publisher) service/system 132 (e.g., deal negotiation model 134C thereof) are trained to capture scenarios where the publisher is negotiating with multiple buyers to sell the same inventory on a first-come-first-served basis. In certain examples, the one or more machine learning (ML) models 134 of the supply side (e.g., content publisher) service/system 132 (e.g., deal negotiation model 134C thereof) ingest history about the number of competing buyers and how quickly inventory sold out, e.g., to help content publishers (e.g., and similarly for content providers for an appropriately trained one or more machine learning (ML) models 130 of the demand (e.g., content provider) side service/system 128) set prices and/or advise them how quickly to accept an offer.

In certain examples, the results of deal execution (e.g., reliability, actualized value, etc.) are included as feedback to train the demand (e.g., content provider) side service/system 128 that includes one or more machine learning (ML) models 130 and/or a supply (e.g., content publisher) side service/system 132 that includes one or more machine learning (ML) models 134, e.g., to learn to avoid deals that were inferred as acceptable but actually execute poorly.

In certain examples, negotiation back-and-forth offers are shortcut via a "menu" of possible choices.

Figure 13:
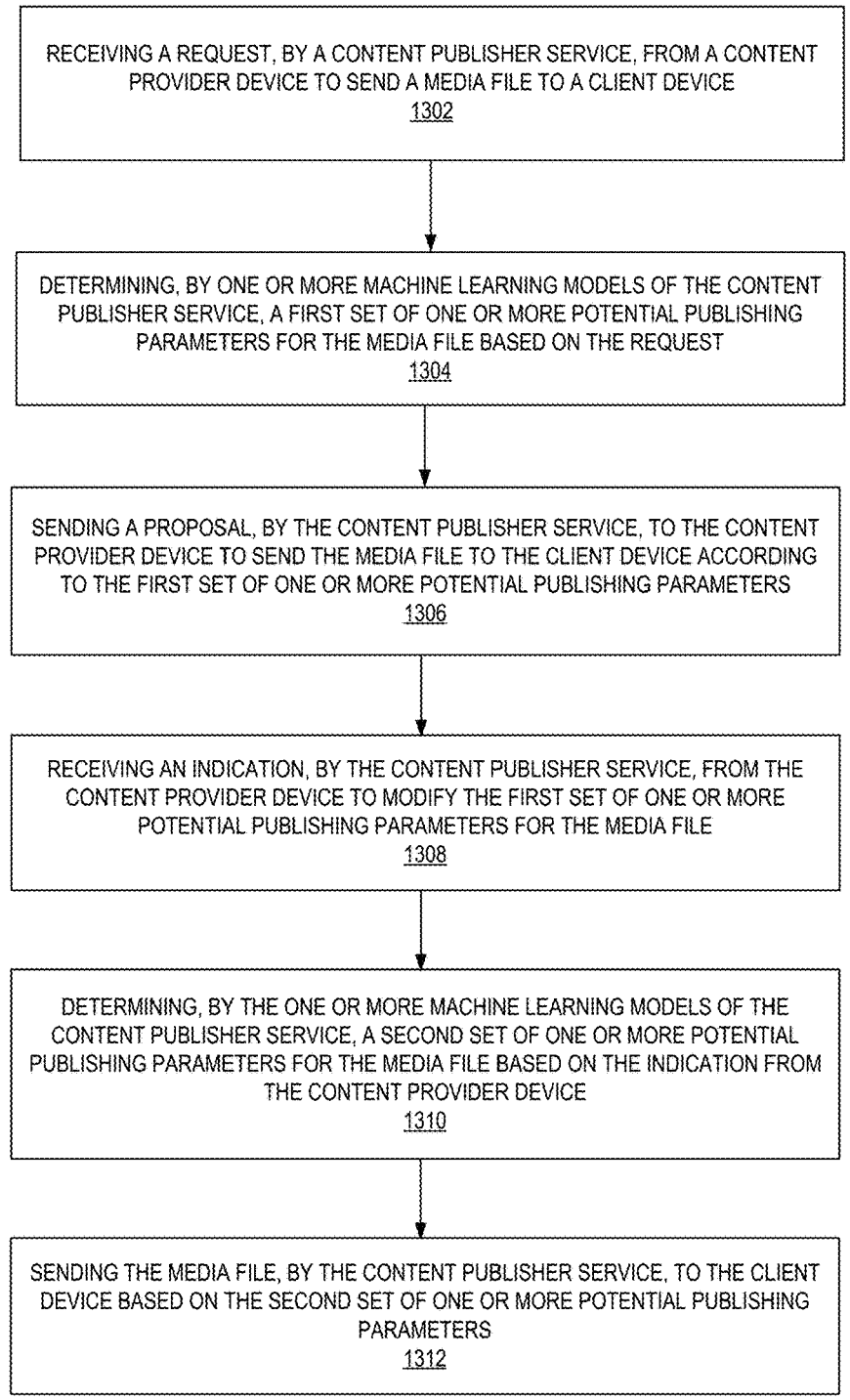
FIG. 13 is a flow diagram illustrating operations of a method of sending a media file to a client device according to some examples.

FIG. 13 is a flow diagram illustrating operations 1300 of a method of sending a media file to a client device according to some examples. Some or all of the operations 1300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1300 are performed by a content delivery service/system 102, demand (e.g., content provider) side service/system 128 that includes one or more machine learning (ML) models 130, and/or a supply (e.g., content publisher) side service/system 132 that includes one or more machine learning (ML) models 134 (e.g., any of these implemented in a provider network) of the other figures.

The operations 1300 include, at block 1302, receiving a request, by a content publisher service, from a content provider device to send a media file to a client device. The operations 1300 further include, at block 1304, determining, by one or more machine learning models of the content publisher service, a first set of one or more potential publishing parameters for the media file based on the request. The operations 1300 further include, at block 1306, sending a proposal, by the content publisher service, to the content provider device to send the media file to the client device according to the first set of one or more potential publishing parameters. The operations 1300 further include, at block 1308, receiving an indication, by the content publisher service, from the content provider device to modify the first set of one or more potential publishing parameters for the media file. The operations 1300 further include, at block 1310, determining, by the one or more machine learning models of the content publisher service, a second set of one or more potential publishing parameters for the media file based on the indication from the content provider device. The operations 1300 further include, at block 1312, sending the media file, by the content publisher service, to the client device based on the second set of one or more potential publishing parameters.

Exemplary environments, systems, etc. that the above may be used in are detailed below.

At least some examples of the disclosed technologies can be described in view of the following examples:

Example 1. A computer-implemented method comprising:
receiving, by a content delivery service, a request from a content provider device to send a media file to a client device;
determining, by a provider intention match machine learning model of the content delivery service, a first set of one or more potential publishing parameters for the media file based on the request;
sending a proposal to the content provider device to send the media file to the client device according to the first set of one or more potential publishing parameters;
receiving, by the content delivery service, an indication from the content provider device to modify the first set of one or more potential publishing parameters for the media file;
determining, by a negotiation simulation machine learning model of the content delivery service, a second set of one or more potential publishing parameters for the media file based on the indication from the content provider device; and
sending the media file to the client device based on the second set of one or more potential publishing parameters.

Example 2. The computer-implemented method of example 1, further comprising training the provider intention match machine learning model on a set of previously used publishing parameters and a set of previously presented but not used publishing parameters.

Example 3. The computer-implemented method of example 1, wherein the negotiation simulation machine learning model generates a plurality of sets of one or more potential publishing parameters for the media file including the second set of one or more potential publishing parameters, and the computer-implemented method further comprises:
presenting an indication of the plurality of sets of one or more potential publishing parameters for the media file via a graphical user interface of the content provider device; and
receiving an indication from the graphical user interface that indicates the content provider device selected the second set of one or more potential publishing parameters.

Example 4. A computer-implemented method comprising:
receiving a request, by a content publisher service, from a content provider device to send a media file to a client device;
determining, by one or more machine learning models of the content publisher service, a first set of one or more potential publishing parameters for the media file based on the request;
sending a proposal, by the content publisher service, to the content provider device to send the media file to the client device according to the first set of one or more potential publishing parameters;
receiving an indication, by the content publisher service, from the content provider device to modify the first set of one or more potential publishing parameters for the media file;
determining, by the one or more machine learning models of the content publisher service, a second set of one or more potential publishing parameters for the media file based on the indication from the content provider device; and
sending the media file, by the content publisher service, to the client device based on the second set of one or more potential publishing parameters.

Example 5. The computer-implemented method of example 4, further comprising training the one or more machine learning models on a set of previously used publishing parameters and a set of previously presented but not used publishing parameters to generate a set of one or more potential publishing parameters for a request for media file publication.

Example 6. The computer-implemented method of example 5, wherein the set of previously used publishing parameters indicates a target audience for one or more media files published under the set of previously used publishing parameters.

Example 7. The computer-implemented method of example 4, wherein the request from the content provider device is not a request selected from a predefined set of one or more potential publishing parameters provided by the content publisher service to the content provider device.

Example 8. The computer-implemented method of example 4, wherein the determining the second set of one or more potential publishing parameters comprises performing a negotiation simulation by a first model trained for content provider objectives and a second model trained for content publisher objectives.

Example 9. The computer-implemented method of example 4, wherein the request from the content provider device includes a human utterance, the computer-implemented method comprises performing an inference on the human utterance by a language processing machine learning model, and the determining the first set of one or more potential publishing parameters is based on the inference.

Example 10. The computer-implemented method of example 4, wherein the determining the second set of one or more potential publishing parameters comprises:

generating a plurality of sets of one or more potential publishing parameters for the media file based on the indication from the content provider device; and selecting the second set of one or more potential publishing parameters from the plurality of sets based on available resources of the content publisher service.

Example 11. The computer-implemented method of example 4, further comprising providing a graphical user interface of the content provider device that comprises a create new request interface element that causes the request to be sent to the content publisher service when selected.

Example 12. The computer-implemented method of example 11, wherein the graphical user interface of the content provider device further comprises a counter proposal interface element that causes the indication to modify the first set of one or more potential publishing parameters to be sent to the content publisher service when selected.

Example 13. The computer-implemented method of example 4, further comprising providing a graphical user interface for the content publisher service that comprises an accept interface element that causes an indication of the second set of one or more potential publishing parameters to be sent to the content provider device when selected.

Example 14. The computer-implemented method of example 13, wherein the sending the media file to the client device is further based on receiving an indication from the content provider device to utilize the second set of one or more potential publishing parameters.

Example 15. A system comprising:

a content data store to store a media file; and one or more electronic devices to implement a content publisher service, the content publisher service including instructions that upon execution cause the content publisher service to perform operations comprising:

receiving a request, by the content publisher service, from a content provider device to send the media file to a client device, determining, by one or more machine learning models of the content publisher service, a first set of one or more potential publishing parameters for the media file based on the request, sending a proposal, by the content publisher service, to the content provider device to send the media file to the client device according to the first set of one or more potential publishing parameters, receiving an indication, by the content publisher service, from the content provider device to modify the first set of one or more potential publishing parameters for the media file, determining, by the one or more machine learning models of the content publisher service, a second set of one or more potential publishing parameters for the media file based on the indication from the content provider device, and sending the media file, by the content publisher service, to the client device based on the second set of one or more potential publishing parameters.

Example 16. The system of example 15, wherein the instructions upon execution cause the content publisher service to perform operations further comprising training the one or more machine learning models on a set of previously used publishing parameters and a set of previously presented but not used publishing parameters to generate a set of one or more potential publishing parameters for a request for media file publication.

Example 17. The system of example 15, wherein the request from the content provider device is not a request selected from a predefined set of one or more potential publishing parameters provided by the content publisher service to the content provider device.

Example 18. The system of example 15, wherein the instructions upon execution cause the content publisher service to perform operations wherein the determining the second set of one or more potential publishing parameters comprises performing a negotiation simulation by a first model trained for content provider objectives and a second model trained for content publisher objectives.

Example 19. The system of example 15, wherein the instructions upon execution cause the content publisher service to perform operations wherein the request from the content provider device includes a human utterance, the operations comprise performing an inference on the human utterance by a language processing machine learning model, and the determining the first set of one or more potential publishing parameters is based on the inference.

Example 20. The system of example 15, wherein the determining the second set of one or more potential publishing parameters comprises:

generating a plurality of sets of one or more potential publishing parameters for the media file based on the indication from the content provider device; and selecting the second set of one or more potential publishing parameters from the plurality of sets based on available resources of the content publisher service.

Figure 14:
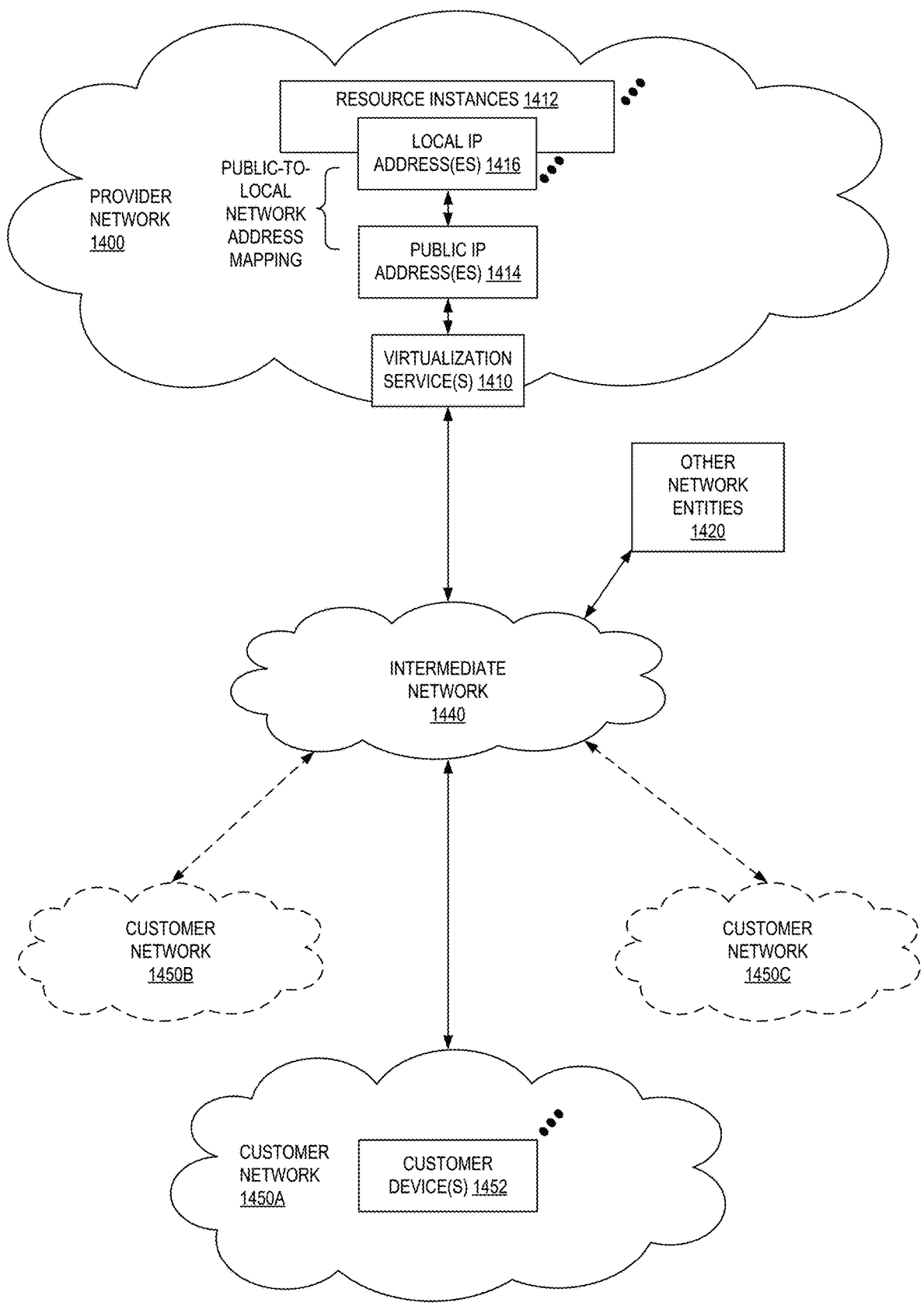
FIG. 14 illustrates an example provider network environment according to some examples.

FIG. 14 illustrates an example provider network (or "service provider system") environment according to some examples. A provider network 1400 may provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 may be associated with the resource instances 1412; the local IP addresses are the internal network addresses of the resource instances 1412 on the provider network 1400. In some examples, the provider network 1400 may also provide public IP addresses 1414 and/or public IP address ranges (e.g., Internet Protocol version 4 (IPv4) or Internet Protocol version 6 (IPv6) addresses) that customers may obtain from the provider network 1400.

Conventionally, the provider network 1400, via the virtualization services 1410, may allow a customer of the service provider (e.g., a customer that operates one or more client networks 1450A-1450C including one or more customer device(s) 1452) to dynamically associate at least some public IP addresses 1414 assigned or allocated to the customer with particular resource instances 1412 assigned to the customer. The provider network 1400 may also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of customer network(s) 1450A-1450C may, for example, implement customer-specific applications and present the customer's applications on an intermediate network 1440, such as the Internet. Other network entities 1420 on the intermediate network 1440 may then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 may be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1400; a customer may then assign their allocated public IP addresses to particular resource instances allocated to the customer. These public IP addresses may be referred to as customer public IP addresses, or simply customer IP addresses. Instead of being assigned by the provider network 1400 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
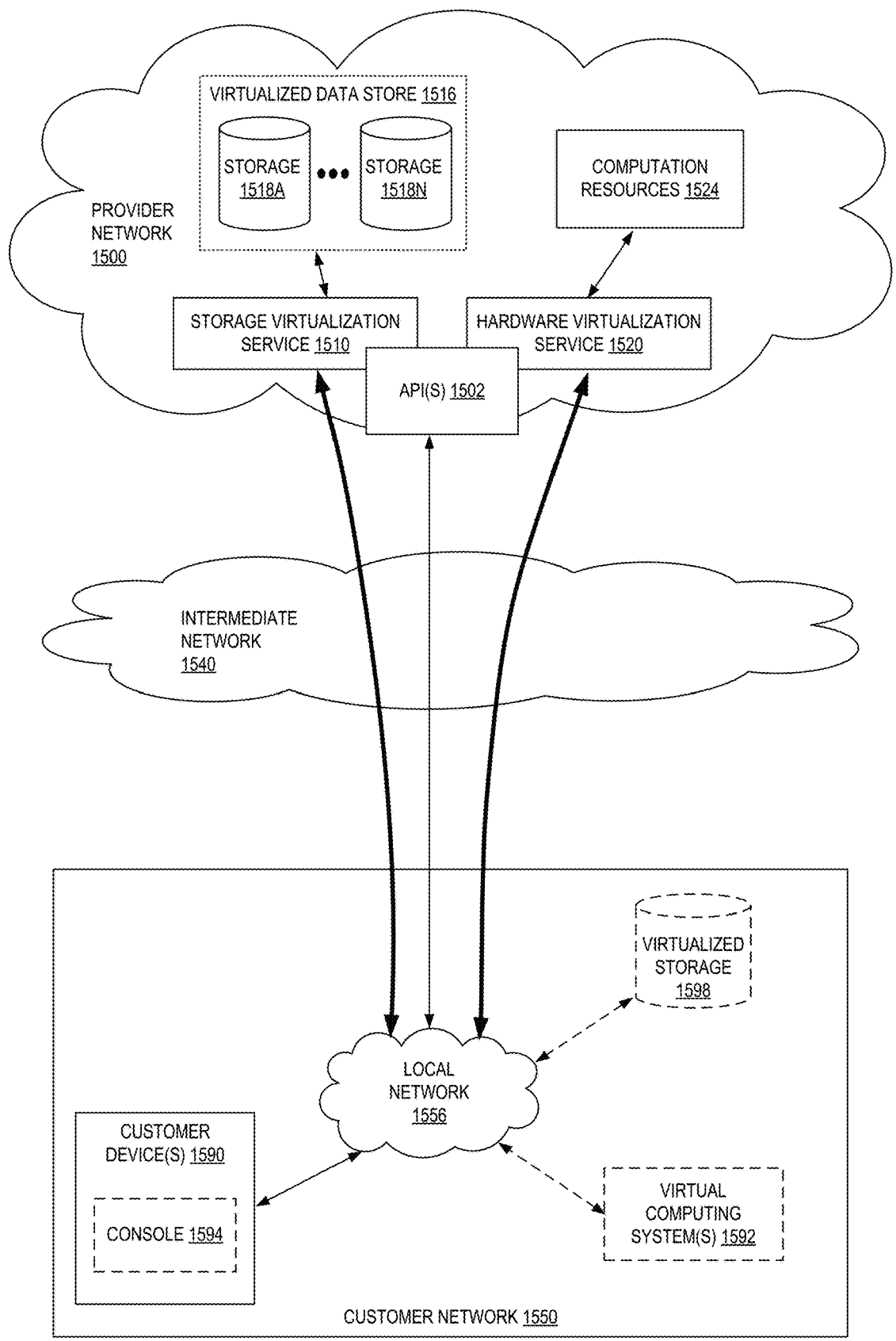
FIG. 15 is a block diagram of an example provider network that provides a storage service and a hardware virtualization service to customers according to some examples.

FIG. 15 is a block diagram of an example provider network that provides a storage service and a hardware virtualization service to customers, according to some examples. Hardware virtualization service 1520 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some examples, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some examples, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage service 1510, for example via one or more APIs 1502, to access data from and store data to storage resources 1518A-1518N of a virtual data store 1516 (e.g., a folder or "bucket", a virtualized volume, a database, etc.) provided by the provider network 1500. In some examples, a virtualized data store gateway (not shown) may be provided at the customer network 1550 that may locally cache at least some data, for example frequently-accessed or critical data, and that may communicate with storage service 1510 via one or more communications channels to upload new or modified data from a local cache so that the primary store of data (virtualized data store 1516) is maintained. In some examples, a user, via a virtual computing system 1592 and/or on another customer device 1590, may mount and access virtual data store 1516 volumes via storage service 1510 acting as a storage virtualization service, and these volumes may appear to the user as local (virtualized) storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

Illustrative System

Figure 16:
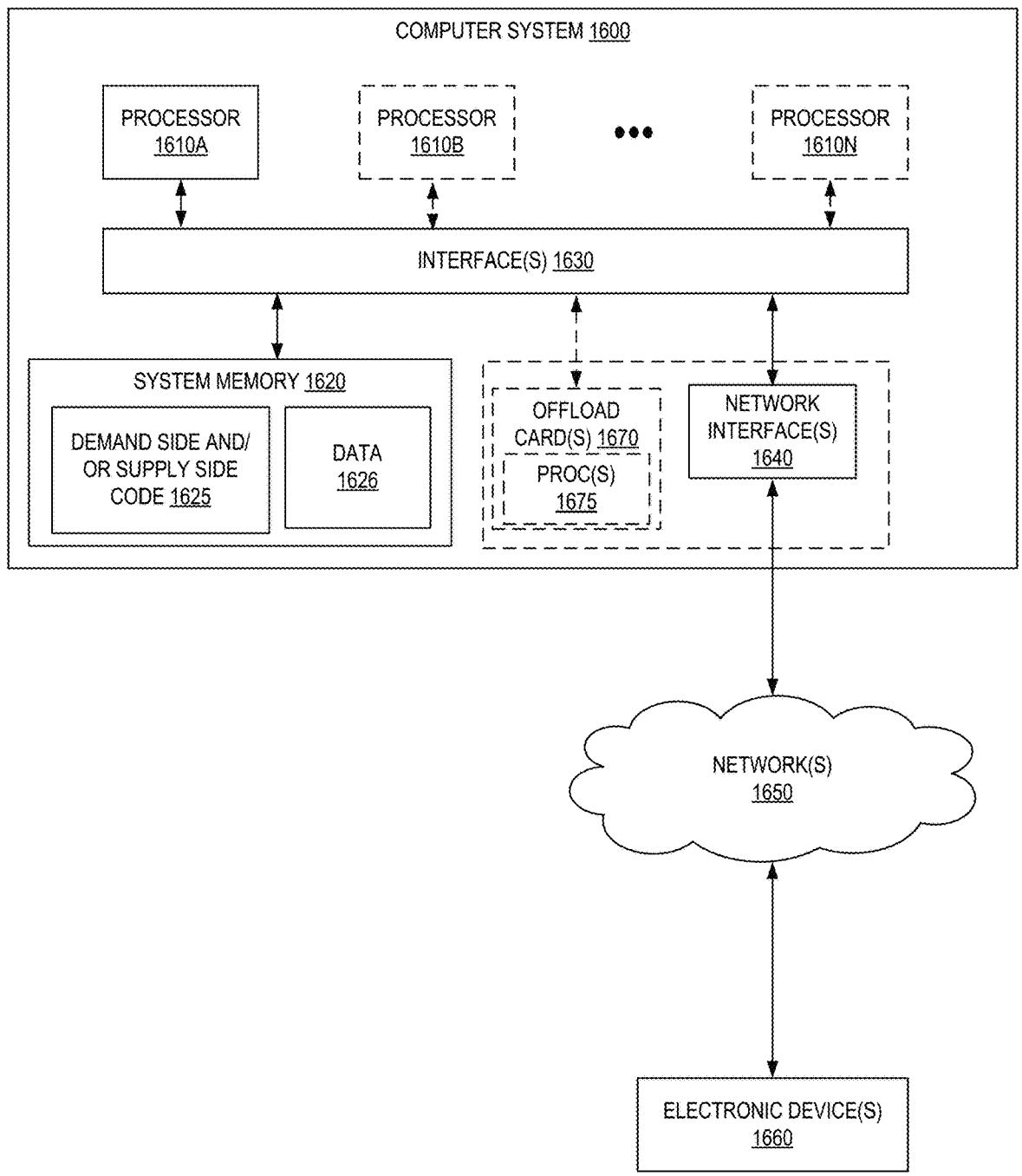
FIG. 16 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1600 illustrated in FIG. 16. In the illustrated example, computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various examples a computer system 1600 may include one computing device or any number of computing devices configured to work together as a single computer system 1600.

In various examples, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various examples, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various examples, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1620 as demand side and/or supply side code 1625 (e.g., executable to implement, in whole or in part, the demand (e.g., content provider) side service 128, the supply (e.g., content publisher) side service 132, and/or other operations discussed herein) and data 1626.

In one example, I/O interface 1630 may be configured to coordinate I/O traffic between processor 1610, system memory 1620, and any peripheral devices in the device, including network interface 1640 or other peripheral interfaces. In some examples, I/O interface 1630 may perform any necessary protocol, timing or other data transformations to convert data signals from one component (e.g., system memory 1620) into a format suitable for use by another component (e.g., processor 1610). In some examples, I/O interface 1630 may include support for devices attached through various types of peripheral buses, such as a variant of the Peripheral Component Interconnect (PCI) bus standard or the Universal Serial Bus (USB) standard, for example. In some examples, the function of I/O interface 1630 may be split into two or more separate components, such as a north bridge and a south bridge, for example. Also, in some examples some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various examples, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1600 includes one or more offload cards 1670 (including one or more processors 1675, and possibly including the one or more network interfaces 1640) that are connected using an I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1600 may act as a host electronic device (e.g., operating as part of a hardware virtualization service) that hosts compute instances, and the one or more offload cards 1670 execute a virtualization manager that can manage compute instances that execute on the host electronic device. As an example, in some examples the offload card(s) 1670 can perform compute instance management operations such as pausing and/or un-pausing compute instances, launching and/or terminating compute instances, performing memory transfer/copying operations, etc. These management operations may, in some examples, be performed by the offload card(s) 1670 in coordination with a hypervisor (e.g., upon a request from a hypervisor) that is executed by the other processors 1610A-1610N of the computer system 1600. However, in some examples the virtualization manager implemented by the offload card(s) 1670 can accommodate requests from other entities (e.g., from compute instances themselves), and may not coordinate with (or service) any separate hypervisor.

In some examples, system memory 1620 may be one example of a computer-accessible medium configured to store program instructions and data as described above. However, in other examples, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Figure 17:
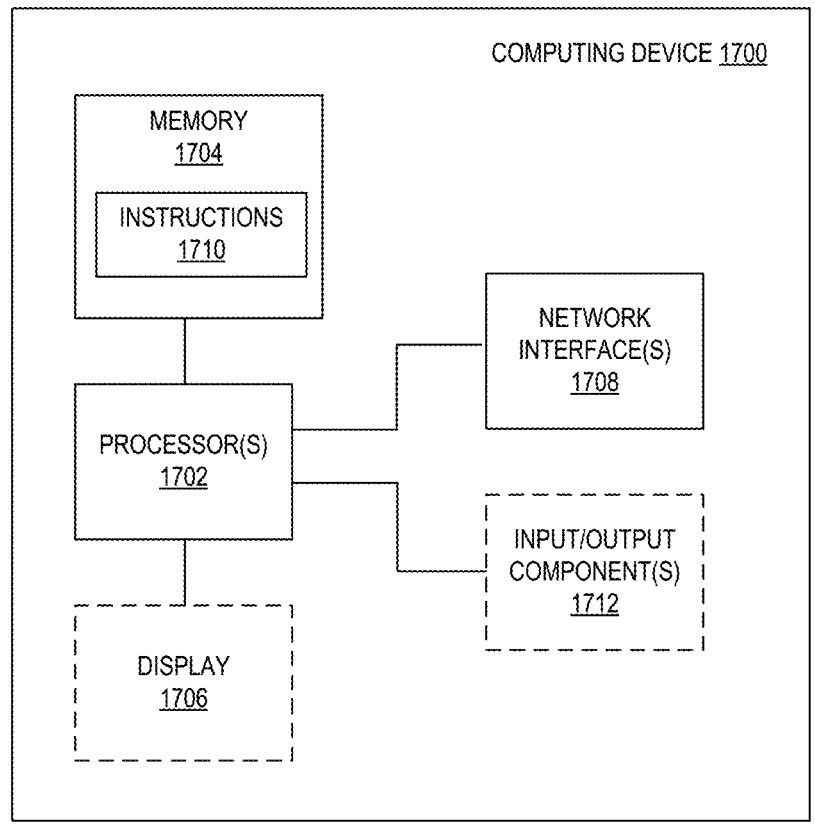
FIG. 17 illustrates a logical arrangement of a set of general components of an exemplary computing device that can be utilized in accordance with various examples.

FIG. 17 illustrates a logical arrangement of a set of general components of an example computing device 1700. Generally, a computing device 1700 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1702 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1704) to store code (for example, instructions 1710, e.g., which implement a content delivery service as disclosed herein), and a set of one or more wired or wireless network interfaces 1708 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1704) of a given electronic device typically stores code (e.g., instructions 1710) for execution on the set of one or more processors 1702 of that electronic device. One or more parts of various examples may be implemented using different combinations of software, firmware, and/or hardware.

A computing device 1700 can include some type of display element 1706, such as a touch screen or liquid crystal display (LCD), although many devices such as portable media players might convey information via other means, such as through audio speakers, and other types of devices such as server end stations may not have a display element 1706 at all. As discussed, some computing devices used in some examples include at least one input and/or output component(s) 1712 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 18:
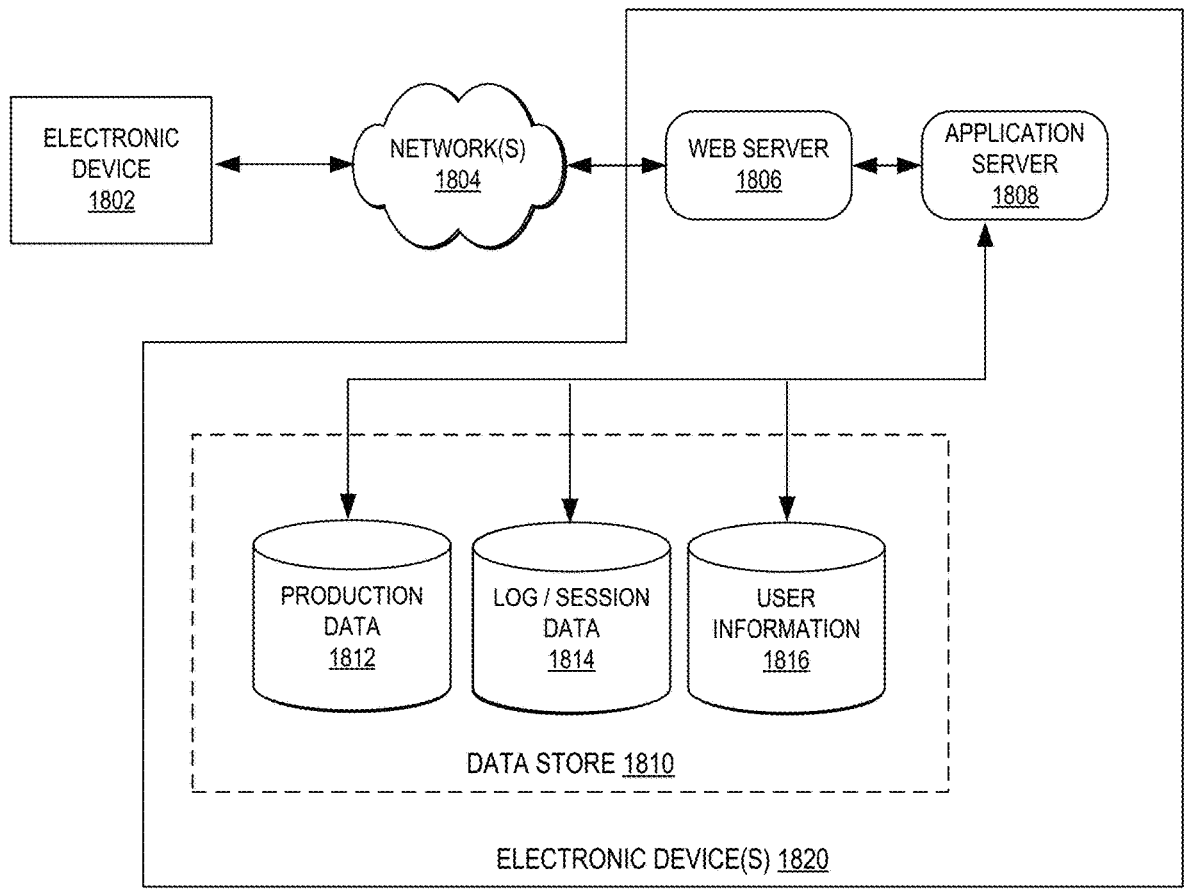
FIG. 18 illustrates an example of an environment for implementing aspects in accordance with various examples.

As discussed, different approaches can be implemented in various environments in accordance with the described examples. For example, FIG. 18 illustrates an example of an environment 1800 for implementing aspects in accordance with various examples. For example, in some examples messages are HyperText Transfer Protocol (HTTP) requests that are received by a web server (e.g., web server 1806), and the users, via electronic devices, may interact with the provider network via a web portal provided via the web server 1806 and application server 1808. As will be appreciated, although a web-based environment is used for purposes of explanation, different environments may be used, as appropriate, to implement various examples. The system includes an electronic client device 1802, which may also be referred to as a client device and can be any appropriate device operable to send and receive requests, messages or information over an appropriate network 1804 and convey information back to a user of the device 1802. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1804 includes the Internet, as the environment includes a web server 1806 for receiving requests and serving content in response thereto, although for other networks an alternative device serving a similar purpose could be used, as would be apparent to one of ordinary skill in the art.

The illustrative environment includes at least one application server 1808 and a data store 1810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1808 can include any appropriate hardware and software for integrating with the data store 1810 as needed to execute aspects of one or more applications for the client device 1802 and handling a majority of the data access and business logic for an application. The application server 1808 provides access control services in cooperation with the data store 1810 and is able to generate content such as text, graphics, audio, video, etc., to be transferred to the client device 1802, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1802 and the application server 1808, can be handled by the web server 1806. It should be understood that the web server 1806 and application server 1808 are not required and are merely example components, as structured code discussed herein can be executed on any appropriate device or host machine as discussed elsewhere herein.

The data store 1810 can include several separate data tables, databases, or other data storage mechanisms and media for storing data relating to a particular aspect. For example, the data store illustrated includes mechanisms for storing production data 1812 and user information 1816, which can be used to serve content for the production side. The data store 1810 also is shown to include a mechanism for storing log or session data 1814. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update, or otherwise process data in response thereto. In one example, a user might submit a search request for a certain type of item. In this case, the data store 1810 might access the user information 1816 to verify the identity of the user and can access a production data 1812 to obtain information about items of that type. The information can then be returned to the user, such as in a listing of results on a web page that the user is able to view via a browser on the user device 1802. Information for a particular item of interest can be viewed in a dedicated page or window of the browser.

The web server 1806, application server 1808, and/or data store 1810 may be implemented by one or more electronic devices 1820, which can also be referred to as electronic server devices or server end stations, and may or may not be located in different geographic locations. Each of the one or more electronic devices 1820 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the environment 1800 in FIG. 18 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1518A-1518N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a content delivery service, a request from a content provider device to send a media file to a client device;
   determining, by a provider intention match machine learning model of the content delivery service, a first set of one or more potential publishing parameters for the media file based on the request;
   sending a proposal to the content provider device to send the media file to the client device according to the first set of one or more potential publishing parameters;
   receiving, by the content delivery service, an indication from the content provider device to modify the first set of one or more potential publishing parameters for the media file;
   determining, by a negotiation simulation machine learning model of the content delivery service, a second set of one or more potential publishing parameters for the media file based on the indication from the content provider device; and
   sending the media file to the client device based on the second set of one or more potential publishing parameters.

2. The computer-implemented method of claim 1, further comprising training the provider intention match machine learning model on a set of previously used publishing parameters and a set of previously presented but not used publishing parameters.

3. The computer-implemented method of claim 1, wherein the negotiation simulation machine learning model generates a plurality of sets of one or more potential publishing parameters for the media file including the second set of one or more potential publishing parameters, and the computer-implemented method further comprises:
   presenting an indication of the plurality of sets of one or more potential publishing parameters for the media file via a graphical user interface of the content provider device; and
   receiving an indication from the graphical user interface that indicates the content provider device selected the second set of one or more potential publishing parameters.

4. A computer-implemented method comprising:
   receiving a request, by a content publisher service, from a content provider device to send a media file to a client device;
   determining, by one or more machine learning models of the content publisher service, a first set of one or more potential publishing parameters for the media file based on the request;
   sending a proposal, by the content publisher service, to the content provider device to send the media file to the client device according to the first set of one or more potential publishing parameters;
   receiving an indication, by the content publisher service, from the content provider device to modify the first set of one or more potential publishing parameters for the media file;

determining, by the one or more machine learning models of the content publisher service, a second set of one or more potential publishing parameters for the media file based on the indication from the content provider device; and sending the media file, by the content publisher service, to the client device based on the second set of one or more potential publishing parameters.

5. The computer-implemented method of claim 4, further comprising training the one or more machine learning models on a set of previously used publishing parameters and a set of previously presented but not used publishing parameters to generate a set of one or more potential publishing parameters for a request for media file publication.

6. The computer-implemented method of claim 5, wherein the set of previously used publishing parameters indicates a target audience for one or more media files published under the set of previously used publishing parameters.

7. The computer-implemented method of claim 4, wherein the request from the content provider device is not a request selected from a predefined set of one or more potential publishing parameters provided by the content publisher service to the content provider device.

8. The computer-implemented method of claim 4, wherein the determining the second set of one or more potential publishing parameters comprises performing a negotiation simulation by a first model trained for content provider objectives and a second model trained for content publisher objectives.

9. The computer-implemented method of claim 4, wherein the request from the content provider device includes a human utterance, the computer-implemented method comprises performing an inference on the human utterance by a language processing machine learning model, and the determining the first set of one or more potential publishing parameters is based on the inference.

10. The computer-implemented method of claim 4, wherein the determining the second set of one or more potential publishing parameters comprises:

generating a plurality of sets of one or more potential publishing parameters for the media file based on the indication from the content provider device; and selecting the second set of one or more potential publishing parameters from the plurality of sets based on available resources of the content publisher service.

11. The computer-implemented method of claim 4, further comprising providing a graphical user interface of the content provider device that comprises a create new request interface element that causes the request to be sent to the content publisher service when selected.

12. The computer-implemented method of claim 11, wherein the graphical user interface of the content provider device further comprises a counter proposal interface element that causes the indication to modify the first set of one or more potential publishing parameters to be sent to the content publisher service when selected.

13. The computer-implemented method of claim 4, further comprising providing a graphical user interface for the content publisher service that comprises an accept interface element that causes an indication of the second set of one or more potential publishing parameters to be sent to the content provider device when selected.

14. The computer-implemented method of claim 13, wherein the sending the media file to the client device is further based on receiving an indication from the content provider device to utilize the second set of one or more potential publishing parameters.

15. A system comprising:

a content data store to store a media file; and one or more electronic devices to implement a content publisher service, the content publisher service including instructions that upon execution cause the content publisher service to perform operations comprising:

receiving a request, by the content publisher service, from a content provider device to send the media file to a client device, determining, by one or more machine learning models of the content publisher service, a first set of one or more potential publishing parameters for the media file based on the request, sending a proposal, by the content publisher service, to the content provider device to send the media file to the client device according to the first set of one or more potential publishing parameters, receiving an indication, by the content publisher service, from the content provider device to modify the first set of one or more potential publishing parameters for the media file, determining, by the one or more machine learning models of the content publisher service, a second set of one or more potential publishing parameters for the media file based on the indication from the content provider device, and sending the media file, by the content publisher service, to the client device based on the second set of one or more potential publishing parameters.

16. The system of claim 15, wherein the instructions upon execution cause the content publisher service to perform operations further comprising training the one or more machine learning models on a set of previously used publishing parameters and a set of previously presented but not used publishing parameters to generate a set of one or more potential publishing parameters for a request for media file publication.

17. The system of claim 15, wherein the request from the content provider device is not a request selected from a predefined set of one or more potential publishing parameters provided by the content publisher service to the content provider device.

18. The system of claim 15, wherein the instructions upon execution cause the content publisher service to perform operations wherein the determining the second set of one or more potential publishing parameters comprises performing a negotiation simulation by a first model trained for content provider objectives and a second model trained for content publisher objectives.

19. The system of claim 15, wherein the instructions upon execution cause the content publisher service to perform operations wherein the request from the content provider device includes a human utterance, the operations comprise performing an inference on the human utterance by a language processing machine learning model, and the determining the first set of one or more potential publishing parameters is based on the inference.

20. The system of claim 15, wherein the determining the second set of one or more potential publishing parameters comprises:

generating a plurality of sets of one or more potential publishing parameters for the media file based on the indication from the content provider device; and selecting the second set of one or more potential publishing parameters from the plurality of sets based on available resources of the content publisher service.

\* \* \* \* \*